(12) United States Patent
Sato et al.

(10) Patent No.: US 8,275,084 B2
(45) Date of Patent: Sep. 25, 2012

(54) MOBILE STATION APPARATUS, BASE STATION APPARATUS, COMMUNICATION METHOD AND COMMUNICATION SYSTEM

(75) Inventors: Seiji Sato, Osaka (JP); Yosuke Akimoto, Osaka (JP); Shohei Yamada, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/949,549

(22) Filed: Nov. 18, 2010

(65) Prior Publication Data

US 2011/0065444 A1    Mar. 17, 2011

Related U.S. Application Data

(62) Division of application No. 12/739,911, filed as application No. PCT/JP2009/054926 on Mar. 13, 2009.

(30) Foreign Application Priority Data

Mar. 19, 2008  (JP) ................................ 2008-072465

(51) Int. Cl.
*H04L 7/00* (2006.01)
(52) U.S. Cl. ......... 375/358; 375/219; 375/295; 375/316
(58) Field of Classification Search .................. 375/219, 375/295, 316, 358
See application file for complete search history.

(56) References Cited

U.S. PATENT DOCUMENTS

| 5,959,500 | A | 9/1999 | Garrido |
|---|---|---|---|
| 7,050,759 | B2 | 5/2006 | Gaal et al. |
| 7,133,682 | B2 | 11/2006 | Seki et al. |
| 7,463,863 | B1 * | 12/2008 | Vermeer ...................... 455/67.7 |
| 7,986,672 | B2 | 7/2011 | Tiedemann, Jr. et al. |

(Continued)

FOREIGN PATENT DOCUMENTS

WO    WO-2006/130742 A1    12/2006

(Continued)

OTHER PUBLICATIONS

"3rd Generation Partnership Project; Technical Specification Group Radio Access Network; Evolved Universal Terrestrial Radio Access (E-UTRA); Physcial Layer Procedures (Release 8)", 3GPP TS 36.213 V8.5.0 (Dec. 2008).

(Continued)

*Primary Examiner* — Ted Wang
(74) *Attorney, Agent, or Firm* — Birch, Stewart, Kolasch & Birch, LLP

(57) ABSTRACT

In the case that periodical transmission of transmission signal number-of-sequence quality indicative signal cannot be performed, the number of transmission signal sequences is clarified in association with reception quality information that is generated immediately after the case, and the base station apparatus performs appropriate communication resource allocation. A mobile station apparatus has a feedback information control section 65 that generates feedback information including reception quality information, transmission signal preprocessing information and transmission signal number-of-sequence information, and a radio transmission section 51 that periodically transmits the generated feedback information to the base station apparatus, where when the radio transmission section 51 does not transmit the transmission signal number-of-sequence information with communication resources periodically allocated from the base station apparatus so as to transmit the transmission signal number-of-sequence information, the radio transmission section 51 transmits the transmission signal number-of-sequence information to the base station apparatus with communication resources enabling transmission of the feedback information allocated from the base station apparatus subsequently to the communication resources.

16 Claims, 13 Drawing Sheets

U.S. PATENT DOCUMENTS

| | | | |
|---|---|---|---|
| 2004/0235439 A1* | 11/2004 | Husted et al. | 455/136 |
| 2004/0248581 A1* | 12/2004 | Seki et al. | 455/450 |
| 2006/0146856 A1 | 7/2006 | Jung et al. | |
| 2006/0165188 A1 | 7/2006 | Wunder et al. | |
| 2007/0097927 A1 | 5/2007 | Gorokhov et al. | |
| 2007/0165745 A1 | 7/2007 | Fonden et al. | |
| 2010/0093287 A1 | 4/2010 | Higuchi et al. | |

FOREIGN PATENT DOCUMENTS

| | | |
|---|---|---|
| WO | WO-2008/018468 A1 | 2/2008 |

OTHER PUBLICATIONS

"3rd Generation Partnership Project; Technical Specification Group Radio Access Network; Evolved Universal Terrestrial Radio Access (E-UTRA); Physical Layer Procedures (Release 8)", 3GPP TS 36.213 V8.2.0 (Mar. 2008).

Eurasian Search Report issued in Eurasian Patent Application No. 201100269 on Jul. 27, 2011.

European Search Report issued in European Patent Application No. 09721471.2 on Jul. 13, 2011.

European Search Report issued in European Patent Application No. 11001274.7 on Aug. 3, 2011.

Icera Semiconductor, "Dropping of RI/PMI Report on PUCCH", 3GPP TSG RAN WG1 Meeting #54, R1-083201, Aug. 18-22, 2008.

Sharp, "Impact of the PMI/RI Report Drop on the PUCCH CQI Report", 3GPP TSG RAN WG1 Meeting #53bis, RI-082273, Warsaw Poland, Jun. 30-Jul. 4, 2008.

U.S. Notice of Allowance issued in U.S. Appl. No. 13/184,391 on Sep. 8, 2011.

U.S. Office Action issued in U.S. Appl. No. 12/739,911 on Sep. 6, 2011.

Summary of AH on AI 6.3.4 "UE Procedures for downlink shared channel", 3GPP TSG-RAN WG1 Meeting #52, Feb. 11-15, 2008, R1-081137.

3GPP TS 36.321 V8.0.0 (Dec. 2007) Technical Specification 3rd Generation Partnership Project; Technical Specification Group Radio Access Network; Evolved Universal Terrestrial Radio Access (E-UTRA) Medium Access Control (MAC) Protocol specification (Release 8).

U.S. Office Action issued in U.S. Appl. No. 12/739,911 on Dec. 28, 2011.

U.S. Office Action issued in U.S. Appl. No. 12/739,911 on Jan. 25, 2011.

U.S. Office Action issued in U.S. Appl. No. 12/739,911 on Mar. 8, 2011.

U.S. Office Action issued in U.S. Appl. No. 12/739,911 on Sep. 29, 2011.

* cited by examiner

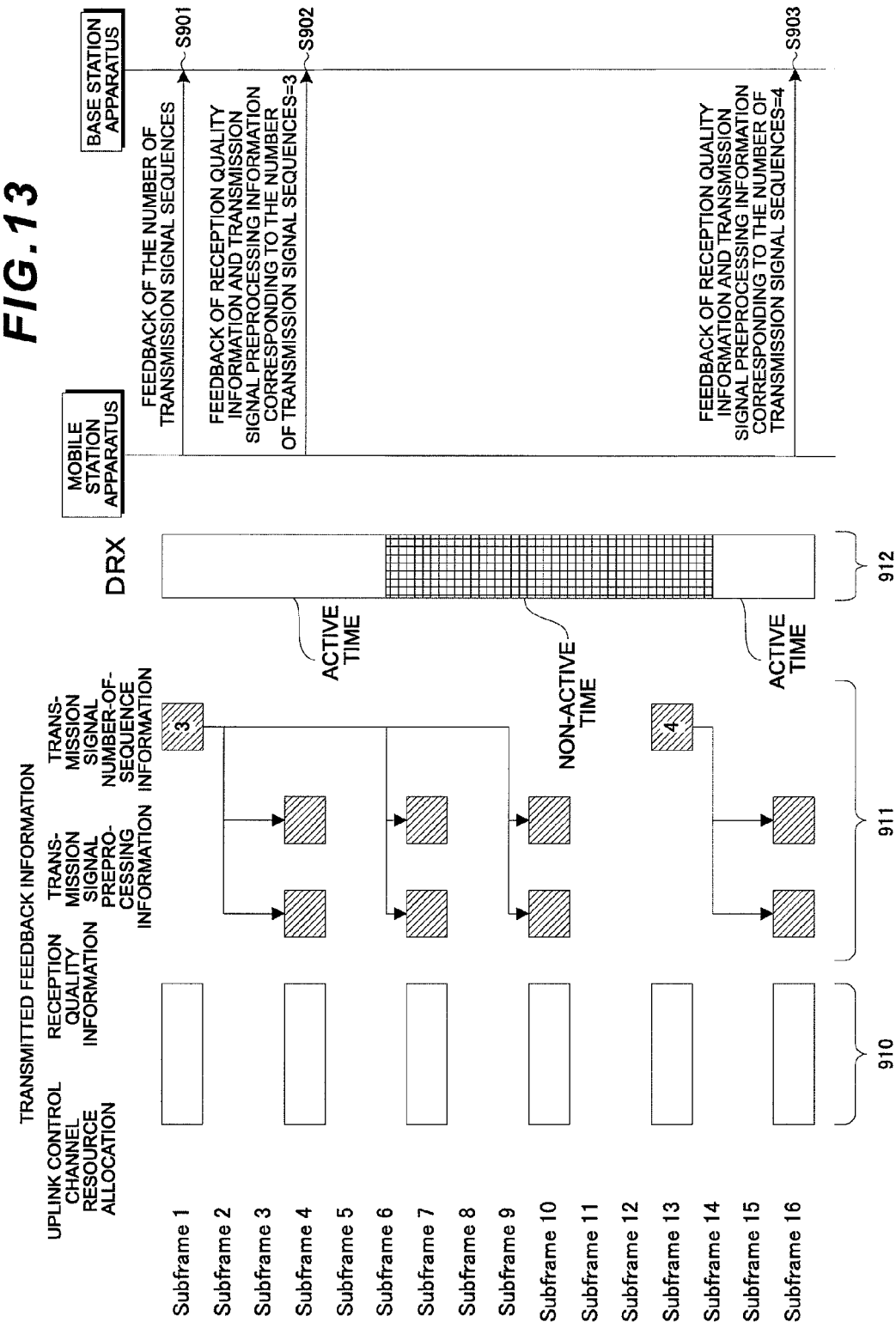

MOBILE STATION APPARATUS, BASE STATION APPARATUS, COMMUNICATION METHOD AND COMMUNICATION SYSTEM

This application is a Divisional of co-pending application Ser. No. 12/739,911 filed on Apr. 26, 2010, and for which priority is claimed under 35 U.S.C. §120; and this application claims priority of Application No. PCT/JP2009/054926 filed on Mar. 13, 2009 under 35 U.S.C. §119; the entire contents of all are hereby incorporated by reference.

TECHNICAL FIELD

The present invention relates to techniques where a mobile station apparatus and base station apparatus perform radio communications using all or a part of a plurality of antennas.

BACKGROUND ART

3GPP (3rd Generation Partnership Project) is a project for discussing and preparing specifications of cellular telephone systems based on networks of evolved W-CDMA (Wideband-Code Division Multiple Access) and GSM (Global System for Mobile Communications). In 3GPP, the W-CDMA system has been standardized as the 3rd-generation cellular mobile communication system, and its service is started sequentially. Further, HSDPA (High-Speed Downlink Packet Access) with further increased communication rates has also been standardized, and its service is started. 3GPP is discussing evolution of the 3rd-generation radio access technique (Evolved Universal Terrestrial Radio Access: hereinafter, referred to as "E-UTRA").

As a downlink communication system in E-UTRA, proposed is an OFDMA (Orthogonal Frequency Division Multiple Access) system for multiplexing users using mutually orthogonal subcarriers. Further, in the OFDMA system are applied techniques such as an adaptive modulation/demodulation-error correcting scheme (AMCS: Adaptive Modulation and Coding Scheme) based on adaptive radio link control such as channel coding, etc.

AMCS is a scheme for switching radio transmission parameters such as a coding rate of error correction, the level of data modulation, etc. corresponding to propagation path conditions of each mobile station apparatus so as to efficiently perform high-speed packet data transmission. For example, data modulation is switched to a multilevel modulation scheme with higher modulation efficiency such 16 QAM (Quadrature Amplitude Modulation), 64 QAM, etc. from QPSK (Quadrature Phase Shift Keying) as the propagation path conditions are better, and it is thereby possible to increase maximum throughput in the mobile communication system.

In OFDMA, it is possible to physically divide the communicable region in the frequency domain corresponding to subcarriers and time domain. A combination of some divided regions is referred to as a resource block, one or more resource blocks are allocated to each mobile station apparatus, and communications are performed while multiplexing a plurality of mobile station apparatuses.

In order that the base station apparatus and each mobile station apparatus perform communications with optimal quality and rate in response to the request, required is resource block allocation and transmission scheme determination with consideration given to the reception quality in each subcarrier in the mobile station apparatus. Since the base station apparatus determines the transmission scheme and scheduling, and only the mobile station apparatus knows downlink propagation path conditions in Frequency Division Duplex, to achieve the request, each mobile station apparatus is required to give feedback of reception quality (corresponding to MCS (Modulation-Error correcting coding scheme) receivable in the mobile station) to base station apparatus. The reception quality of each mobile station apparatus is fed back to the base station apparatus by using CQI (Channel Quality Indicator).

Further, to increase the communication path capacity in E-UTRA, the use of transmission diversity has been proposed such as SM (Space Multiplexing) technique using MIMO (Multiple Input Multiple Output), SFBC (Space-Frequency Block Code) and the like. By using MIMO, it is possible to form a plurality of propagation paths as a space due to the effect of multipath, and multiplex a plurality of pieces of information to transmit. On the reception side, it is possible to combine power of a plurality of transmission antennas to obtain the reception gain. Herein, these techniques are collectively referred to as MIMO. In E-UTRA, it is assumed to use SM by MIMO and transmission diversity on downlink, and the scheme to perform communications is determined in consideration of propagation path conditions between the base station apparatus and mobile station apparatus.

In using MIMO-SM, to facilitate separation processing of a plurality of space multiplexed sequences transmitted from antennas, it is considered that the base station apparatus beforehand performs preprocessing on transmission signal sequences. The information of the transmission signal preprocessing cannot be calculated in the base station apparatus, and each mobile station apparatus needs to transmit the transmission signal preprocessing information to the base station apparatus as feedback in MIMO-SM communication.

Further, in MIMO-SM, the information of the number of spatially multiplexed signal sequences is also dependent on the propagation path between the mobile station apparatus and base station apparatus, and is calculated in the mobile station apparatus based on a reference signal transmitted from the base station apparatus. In other words, each mobile station apparatus needs to give feedback of this information to the base station apparatus as well as the above-mentioned feedback information.

As described above, to achieve MIMO-SM communication, each mobile station apparatus is required to transmit three kinds of information i.e. the reception quality information, transmission signal preprocessing information, and transmission signal number-of-sequence information as feedback for the communication path with the base station apparatus. The number of bits, format and transmission frequency required to give each feedback are different from one another, and are varied in a respective period corresponding to propagation path conditions and conditions of the mobile station apparatus.

More specifically, time variations are more moderate in the optimal number of sequences of transmission signals than in the transmission signal preprocessing information. When scheduling is performed to always concurrently transmit the optimal number of sequences of transmission signals and the transmission signal preprocessing information, and feedback is performed in accordance with the transmission period of the transmission signal preprocessing information, the number of sequences of transmission signals that is not varied undergoes feedback many times, and as a result, overhead arises in uplink resources. Meanwhile, when feedback is performed in accordance with the transmission period of the number of sequences of transmission signals, information of the transmission signal preprocessing information is insufficient in the base station apparatus. As a result, MIMO communication is performed by the preprocessing that is not suitable for the transmission signal, and system throughput decreases.

Further, the information amounts of the reception quality information and transmission signal preprocessing information are varied with the number of transmission signal sequences. More specifically, when different modulation schemes are applied for each transmission signal sequence, the reception quality information is required corresponding to the number of sequences. Further, the transmission signal preprocessing information is information represented by a matrix corresponding to the number of transmission signal sequences and the number of transmission antennas, and the number of required bits varies according to the number of transmission signal sequences. From such a feature, it is effective to transmit the number of transmission signal sequences fast among the above-mentioned feedback information, and to subsequently transmit the reception quality information and transmission signal preprocessing information corresponding to the reception quality information.

FIG. 11 contains a timing chart and sequence chart showing the flow of processing between the base station apparatus and mobile station apparatus in the conventional mobile communication system. An example as shown in FIG. 11 is to implement a mechanism as described in Non-patent Document to periodically transmit the reception quality information, transmission signal preprocessing information and the number of transmission signal sequences, is an example of transmitting each kind of feedback information on a periodically assigned uplink control channel (PUCCH: Physical Uplink Control Channel), and describes feedback of from subframes 1 to 16.

Herein, to simplify, omitted are downlink signals, uplink data signals, and feedback information such as ACK/NACK (Positive Acknowledgement/Negative Acknowledgement) transmitted to the base station apparatus from the mobile station apparatus, and the like. In this example, resources of the uplink control channel are allocated before subframe 1, and starting from subframe 1, resources are allocated every three subframes (710). For the reception quality information, transmission signal preprocessing information and the number of transmission signal sequences transmitted using the resources, their transmission timings are shown in "711".

The base station apparatus notifies the mobile station apparatus of information about the number of times once which the number of transmission signal sequences is transmitted in the resources, and in this example, it is set that such information is transmitted once every four times in allocated resources. In other words, the number of transmission signal sequences is periodically transmitted in subframes 1 and 13, and it is assumed that the numbers of transmission signal sequences are "3" and "4" respectively (steps S701, S705). In remaining resources i.e. in subframes 4, 7, 10 and 16, the reception quality information and transmission signal preprocessing information is periodically transmitted (steps S702, 703, S704, S706).

At this point, the reception quality information and transmission signal preprocessing information is corresponding to the last transmitted number of transmission signal sequences. In other words, transmitted in subframes 4, 7 and 10 is the reception quality information and transmission signal preprocessing information corresponding to the number of transmission signal sequences transmitted in the subframe 1 i.e. "3". Transmitted in a subframe 16 is the reception quality information and transmission signal preprocessing information corresponding to the number of transmission signal sequences transmitted in a subframe 13 i.e. "4".

Meanwhile, in E-UTRA, to suppress power consumption in the mobile station apparatus, there is a technique of DRX (Discontinuous Reception) that the power is turned on only for the duration required by the mobile station apparatus to receive signals. FIG. 12 is a diagram showing the outline of DRX control. The mobile station apparatus repeats on-duration 802 and opportunity for DRX 803 in a DRX cycle 801 (repetition cycle). When the on-duration and DRX cycle are configured, the opportunity for DRX is uniquely determined. The on-duration is a period of time formed of one or more subframes defined to monitor PDCCH.

In the on-duration, the base station apparatus transmits PDCCH to start uplink or downlink resource allocation. A mobile station apparatus receiving PDCCH indicative of scheduling of uplink or downlink initial transmission data (new data) in the on-duration monitors PDCCH for a predetermined duration after the on-duration (804). Further, for a duration having the possibility of retransmission of uplink data or downlink data, the mobile station apparatus monitors PDCCH irrespective of whether the duration is in or out of the on-duration range (805). The duration is referred to as Active Time during which the receiving section of the mobile station apparatus is started and active to monitor PDCCH (806).

The base station apparatus transmits data during the Active Time of the mobile station apparatus. The base station apparatus beforehand notifies the mobile station apparatus of the repetition period and on-duration of the DRX cycle, and the mobile station apparatus beforehand repeats power-on periodically based on the information, while performing power-on corresponding to reception conditions of PDCCH and data retransmission conditions (see Non-patent Document 2).

Described next is an example of feedback as shown in Non-patent Document 1 with the aforementioned DRX considered. FIG. 13 contains a timing chart and sequence chart showing the flow of processing between the base station apparatus and mobile station apparatus in the conventional mobile communication system. DRX is shown in "912" in FIG. 13, and subframes 6 to 14 correspond to the duration (herein, referred to as Non-active Time) except the Active Time. As shown in "910", resources of each kind of feedback information are allocated in subframes 1, 4, 7, 10, 13 and 16 as in the example of FIG. 11, and the base station apparatus sets the transmission signal number-of-sequence information to be transmitted at a frequency of once every four times in the allocated resources.

In other words, feedback is set to transmit the transmission signal number-of-sequence information in subframes 1 and 13 and the reception quality information and transmission signal preprocessing information in subframes 4, 7, 10 and 16. In addition, in order to halt feedback in accordance with the Non-active Time of DRX notified from the base station apparatus, feedback from the mobile station apparatus is given only in subframes 1, 14 and 16, and transmitted as feedback is the transmission signal number-of-sequence information (step S901), the reception quality information and transmission signal preprocessing information (step S902), and the reception quality information and transmission signal preprocessing information (step S903).

However, transmission of the number of transmission signal sequences in the subframe 13 corresponding to the subframe 16 (step S903) is in the Non-active Time, and there is the problem that the base station apparatus cannot know information that the reception quality information and transmission signal preprocessing information transmitted in the subframe 16 (step S903) corresponds to which number of transmission signal sequences. Non-patent Document 2 describes calculating and transmitting the reception quality information and transmission signal preprocessing information according to the last transmitted number of transmission signal sequences, but when the opportunity for DRX is large with respect to a rate of change in propagation path, the possibility is high that the number of transmission signal sequences is varied from the optimal number, and as a result, there is the fear of reducing throughput characteristics.

Further, as in the case of not transmitting the number of transmission signal sequences due to DRX, such a case arises that the number of transmission signal sequences cannot be transmitted because it is necessary to transmit another information with a higher priority at timing scheduled to transmit the number of transmission signal sequences.

[Non-patent Document 1] Summary of AH on AI 6.3.4 "UE Procedures for downlink shared channel",
3GPP TSG-RAN WG1 Meeting #52, R1-081137
[Non-patent Document 2] 3GPP TS 36.321 V8.0.0 (2007-12) Technical Specification 3rd Generation Partnership Project; Technical Specification Group Radio Access Network; Evolved Universal Terrestrial Radio Access (E-UTRA) Medium Access Control (MAC) protocol specification (Release 8)

DISCLOSURE OF INVENTION

Problems to be Solved by the Invention

However, in the aforementioned conventional techniques, for example, when the transmission timing of the transmission signal number-of-sequence information that is transmitted periodically from the mobile station apparatus is made transmission disabled due to a reason of Discontinuous Reception or the like, the transmission signal number-of-sequence information is not transmitted, and there is the problem that the base station apparatus does not know which number of transmission signal sequences is associated with the reception quality information that is received immediately after the Discontinuous Reception.

In this case, it is considered that the mobile station apparatus transmits the reception quality information according to the transmission signal number-of-sequence information transmitted immediately before Discontinuous Reception starts. However, for example, when the moving speed of the mobile station apparatus is fast, a change occurs in the propagation path conditions under circumstances where the transmission signal number-of-sequence information cannot be transmitted, the suitable number of transmission signal sequences is also varied according to the change, the reception quality information itself loses reliability, and there is the problem that downlink reception characteristics deteriorate.

The present invention was made in view of such circumstances, and it is an object of the invention to provide a mobile station apparatus, base station apparatus, communication method and communication system for clarifying the number of transmission signal sequences in association with reception quality information that is generated immediately after the case where periodical transmission of transmission signal number-of-sequence quality indicative signal cannot be performed, and enabling the base station apparatus to perform appropriate communication resource allocation.

Means for Solving the Problem (1) To attain the above-mentioned object, the present invention took measures as described below. In other words, a mobile communication system of the invention is a mobile communication system in which a mobile station apparatus periodically transmits transmission signal number-of-sequence information and reception quality information calculated based on the transmission signal number-of-sequence information to the base station apparatus, and is characterized in that the mobile station apparatus calculates the reception quality information based on the beforehand determined number of transmission signal sequences when the transmission signal number-of-sequence information is not transmitted to the base station apparatus, and that the base station apparatus processes the reception quality information based on the beforehand determined number of transmission signal sequences when the transmission signal number-of-sequence information is not transmitted.

(2) Further, in the mobile communication system of the invention, it is a feature that the beforehand determined number of transmission signal sequences is the minimum number of transmission signal sequences.

(3) Furthermore, in the mobile communication system of the invention, it is another feature that the beforehand determined number of transmission signal sequences is the maximum number of transmission signal sequences.

(4) Further, a mobile communication system of the invention is a mobile communication system in which a mobile station apparatus periodically transmits transmission signal number-of-sequence information and transmission signal preprocessing information calculated based on the transmission signal number-of-sequence information to a base station apparatus, and is characterized in that the mobile station apparatus calculates the transmission signal preprocessing information based on the beforehand determined number of transmission signal sequences when the transmission signal number-of-sequence information is not transmitted to the base station apparatus, and that the base station apparatus processes the transmission signal preprocessing information based on the beforehand determined number of transmission signal sequences when the transmission signal number-of-sequence information is not transmitted.

(5) Furthermore, in the mobile communication system of the invention, it is a feature that the beforehand determined number of transmission signal sequences is the minimum number of transmission signal sequences.

(6) Still furthermore, in the mobile communication system of the invention, it is another feature that the beforehand determined number of transmission signal sequences is the maximum number of transmission signal sequences.

(7) Further, a base station apparatus of the invention is a base station apparatus that periodically receives transmission signal number-of-sequence information and reception quality information that is calculated in a mobile station apparatus based on the transmission signal number-of-sequence information from the mobile station apparatus, and is characterized by having means for processing the reception quality information based on the beforehand determined number of transmission signal sequences when the transmission signal number-of-sequence information is not transmitted.

(8) Furthermore, in the base station apparatus of the invention, it is a feature that the beforehand determined number of transmission signal sequences is the minimum number of transmission signal sequences.

(9) Still furthermore, in the base station apparatus of the invention, it is another feature that the beforehand determined number of transmission signal sequences is the maximum number of transmission signal sequences.

(10) Further, a base station apparatus of the invention is a base station apparatus that periodically receives transmission signal number-of-sequence information and transmission signal preprocessing information that is calculated in a mobile station apparatus based on the transmission signal number-of-sequence information from the mobile station apparatus, and is characterized by having means for processing the transmission signal preprocessing information based on the beforehand determined number of transmission signal sequences when the transmission signal number-of-sequence information is not transmitted.

(11) Furthermore, in the base station apparatus of the invention, it is a feature that the beforehand determined number of transmission signal sequences is the minimum number of transmission signal sequences.

(12) Still furthermore, in the base station apparatus of the invention, it is another feature that the beforehand determined number of transmission signal sequences is the maximum number of transmission signal sequences.

(13) Further, a mobile station apparatus of the invention is a mobile station apparatus that periodically transmits transmission signal number-of-sequence information and reception quality information calculated based on the transmission signal number-of-sequence information to a base station apparatus, and is characterized by having means for calculating the reception quality information based on the beforehand determined number of transmission signal sequences when the transmission signal number-of-sequence information is not transmitted.

(14) Furthermore, in the mobile station apparatus of the invention, it is a feature that the beforehand determined number of transmission signal sequences is the minimum number of transmission signal sequences.

(15) Still furthermore, in the mobile station apparatus of the invention, it is another feature that the beforehand determined number of transmission signal sequences is the maximum number of transmission signal sequences.

(16) Further, a mobile station apparatus of the invention is a mobile station apparatus that periodically transmits transmission signal number-of-sequence information and transmission signal preprocessing information calculated based on the transmission signal number-of-sequence information to a base station apparatus, and is characterized by having means for calculating the transmission signal preprocessing information based on the beforehand determined number of transmission signal sequences when the transmission signal number-of-sequence information is not transmitted.

(17) Furthermore, in the mobile station apparatus of the invention, it is a feature that the beforehand determined number of transmission signal sequences is the minimum number of transmission signal sequences.

(18) Still furthermore, in the mobile station apparatus of the invention, it is another feature that the beforehand determined number of transmission signal sequences is the maximum number of transmission signal sequences.

Advantageous Effect of the Invention

According to the invention, when the transmission signal number-of-sequence information is not transmitted with communication resources periodically allocated by the base station apparatus so as to transmit the transmission signal number-of-sequence information, the transmission signal number-of-sequence information is transmitted to the base station apparatus with communication resources enabling the feedback information to be transmitted allocated by the base station apparatus subsequently to the communication resources. Therefore, for example, even when the mobile station apparatus cannot transmit feedback of the transmission signal number-of-sequence information to the base station apparatus because a subframe that is the transmission timing of the transmission signal number-of-sequence information is in a period of Non-active Time of DRX, the mobile station apparatus can give feedback in a subframe with uplink control channel resource allocation subsequent to the end of the Non-active Time of DRX. By this means, the base station apparatus is able to know the correct transmission signal number-of-sequence information after the end of the Non-active Time of DRX, and is able to perform appropriate downlink communication resource allocation based on the subsequently transmitted reception quality information and transmission signal preprocessing information.

BRIEF DESCRIPTION OF DRAWINGS

FIG. 13 contains another timing chart and sequence chart showing the flow of processing between the base station apparatus and mobile station apparatus in the conventional mobile communication system.

DESCRIPTION OF SYMBOLS

Figure 1:
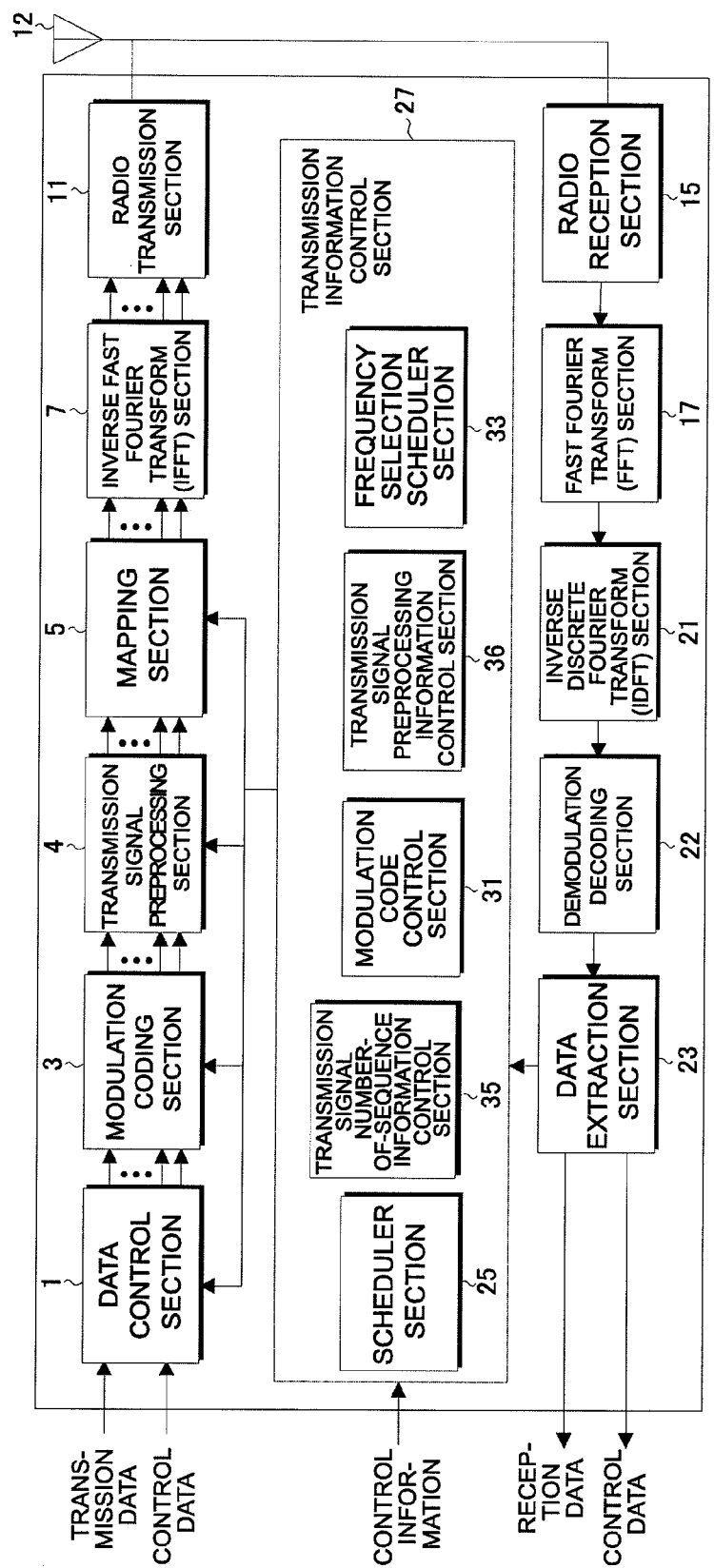
FIG. 1 is a block diagram showing a configuration example of a base station apparatus according to Embodiments of the invention.

1 Data control section
3 Modulation coding section
4 Transmission signal preprocessing section
5 Mapping section
7 Inverse Fast Fourier Transform (IFFT) section
11 Radio transmission section 12 Antenna
15 Radio reception section
17 Fast Fourier Transform (FFT) section
21 Inverse Discrete Fourier Transform (IDFT) section
22 Demodulation decoding section
23 Data extraction section
25 Scheduler section
27 Transmission information control section
31 Modulation code control section
33 Frequency selection scheduler section
35 Transmission signal number-of-sequence information control section
36 Transmission signal preprocessing information control section
41 Data control section
43 Modulation coding section
44 Discrete Fourier Transform (DFT) section
45 Mapping section
47 Inverse Fast Fourier Transform (IFFT) section
51 Radio transmission section
53 Radio reception section
55 Fast Fourier Transform (FFT) section
57 Demodulation decoding section
61 Data extraction section
63 Antenna
65 Feedback information control section
67 Reception quality information generating section
68 Transmission signal preprocessing information generating section
69 Transmission signal number-of-sequence information generating section
71 Reception quality measuring section

BEST MODE FOR CARRYING OUT THE INVENTION

Embodiments of the invention will specifically be described below with reference to drawings. In addition, in the following description, the invention is embodied using a mobile communication system, but is not limited thereto, and is achieved as a mobile communication method.

Embodiment 1

Figure 2:
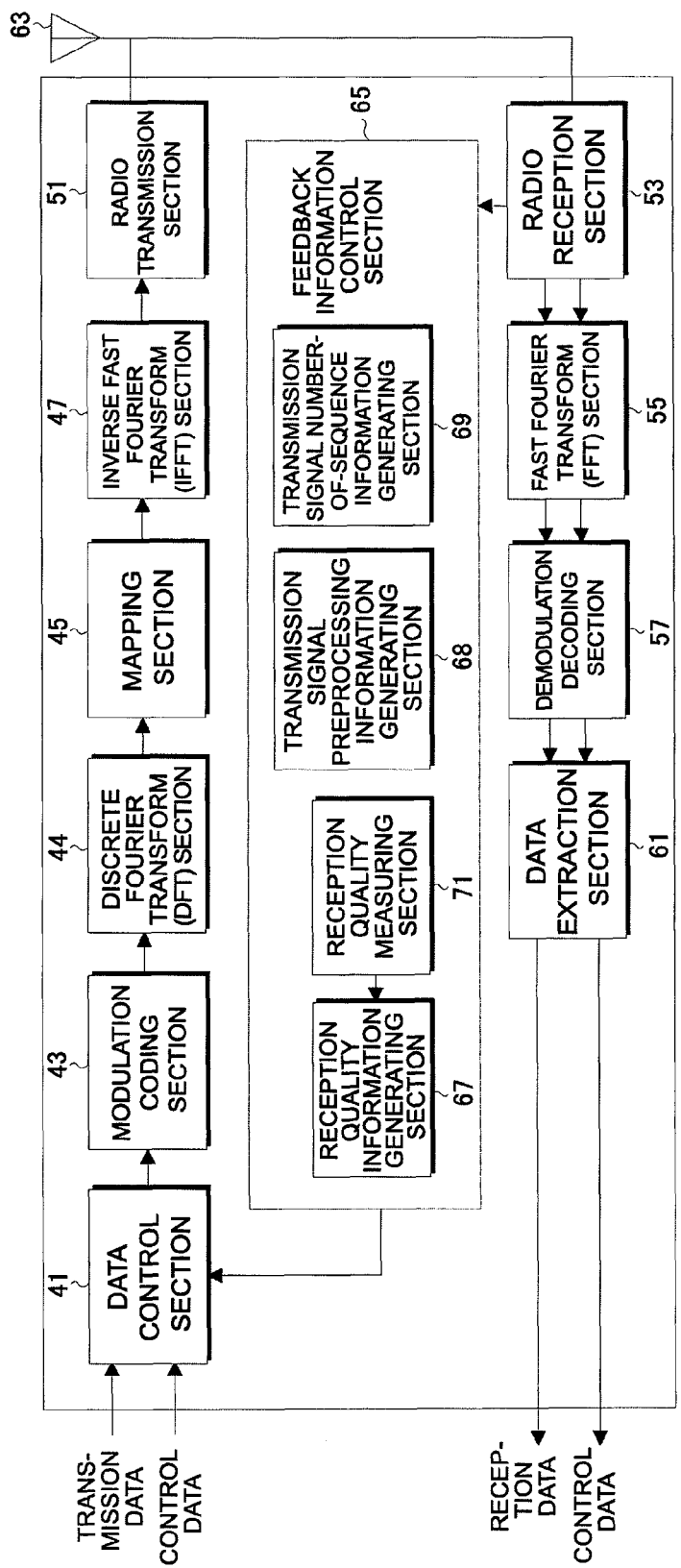
FIG. 2 is a block diagram showing a configuration example of a mobile station apparatus according to Embodiments of the invention.

A mobile communication system according to Embodiment 1 of the invention is comprised of base station apparatuses and mobile station apparatuses. FIGS. 1 and 2 are block diagrams showing configuration examples of the base station apparatus and the mobile station apparatus according to this Embodiment, respectively. As shown in FIG. 1, the base station apparatus is provided with a data control section 1, modulation coding section 3, transmission signal preprocessing section 4, mapping section 5, Inverse Fast Fourier Transform (IFFT) section 7, radio transmission section 11, radio reception section 15, Fast Fourier Transform (FFT) section 17, Inverse Discrete Fourier Transform (IDFT) section 21, demodulation decoding section 22, data extraction section 23, transmission information control section 27, and antenna 12.

The transmission information control section 27 includes a scheduler section 25, modulation code control section 31, frequency selection scheduler section 33, transmission signal number-of-sequence information control section 35, and transmission signal preprocessing information control section 36. The antenna 12 has the number of antennas required for MIMO-SDM communication.

The data control section 1 receives transmission data and control data to transmit to each mobile station apparatus, and each data is sequentially transmitted to the mobile station apparatus according to directions from the transmission information control section 27. When MIMO-SDM is applied to output data, the data is divided into a plurality of transmission sequences according to information of the transmission signal number-of-sequence information control section 35.

The modulation coding section 3 performs modulation processing and error correcting coding processing on a signal input from the data control section 1, based on a modulation scheme and coding rate by the transmission information control section 27, and outputs the resultant signal to the transmission signal preprocessing section 4. The transmission signal preprocessing section 4 processes the signal input from the modulation coding section 3 based on control information input from the transmission information control section 27, and outputs the resultant signal to the mapping section 5.

The mapping section 5 performs mapping of data output from the modulation coding section 3 on each subcarrier based on frequency selection scheduling information input from the transmission information control section 27, and outputs the resultant signal to the Inverse Fast Fourier Transform section 7. The Inverse Fast Fourier Transform section 7 performs processing of Inverse Fast Fourier Transform on the data output from the mapping section 5 to transform into a time-series baseband digital signal, and outputs the resultant signal to the radio transmission section 11.

The output signal from the Inverse Fast Fourier Transform section 7 undergoes digital/analog conversion in the radio transmission section 11, is up-converted into a signal with a frequency suitable for transmission, and transmitted to each mobile station apparatus via the antenna 12.

The scheduler section 25 performs downlink scheduling and uplink scheduling based on control information such as a resource area usable for each mobile station apparatus, intermittent transmission/reception cycle, format of a transmission data channel, buffer status and the like, while performing control of varying the number of transmission signal sequences. The modulation code control section 31 determines a modulation scheme and coding rate applied to each data based on reception quality information transmitted from the mobile station apparatus.

The frequency selection scheduler section 33 performs processing of frequency selection scheduling applied to each data, based on the feedback information transmitted from the mobile station apparatus. The transmission signal number-of-sequence information control section 35 determines the number of sequences of transmission signals, based on the transmission signal number-of-sequence information transmitted from the mobile station apparatus, traffic status of the base station apparatus and the like. The transmission signal preprocessing information control section 36 determines preprocessing to apply to the transmission data based on the transmission signal preprocessing information transmitted from the mobile station apparatus.

The transmission information control section 27 controls operations of the scheduler section 25, modulation code control section 31, frequency selection scheduler section 33, transmission signal number-of-sequence information control section 35, transmission signal preprocessing information control section 36, and transmission information control section 27, using control information input from the higher layer and control information input from the data extraction section 23. The section 27 manages the output information of each section to output control information required for operations of the data control section 1, modulation coding section 3, transmission signal preprocessing section 4 and mapping section 5.

The radio reception section 15 performs analog/digital conversion on a signal received in the antenna 12 to down-covert into a baseband signal, and outputs the resultant signal to the Fast Fourier Transform (FFT) section 17. The Fast Fourier Transform (FFT) section 17 performs Fourier transform on the reception signal on a unit processing time basis to output to the Inverse Discrete Fourier Transform section 21. The Inverse Discrete Fourier Transform section 21 divides the input signal into bands assigned to respective mobile station apparatuses to perform Inverse Fourier transform processing, and outputs a reproduced SC-FDMA signal to the demodulation decoding section 22.

The demodulation decoding section 22 performs demodulation and decoding on the input signal for each mobile station apparatus to output to the data extraction section 23. The data extraction section 23 divides the signal input from the demodulation decoding section 22 into information required for control information generation in the transmission information control section 27, reception data, and control data required for the higher layer to output.

Meanwhile, as shown in FIG. 2, the mobile station apparatus is provided with a data control section 41, modulation coding section 43, Discrete Fourier Transform (DFT) section 44, mapping section 45, Inverse Fast Fourier Transform (IFFT) section 47, radio transmission section 51, radio reception section 53, Fast Fourier Transform (FFT) section 55, demodulation decoding section 57, data extraction section 61, and antenna 63. A feedback information control section 65 has a reception quality information generating section 67, reception quality measuring section 71, transmission signal preprocessing information generating section 68, and transmission signal number-of-sequence information generating section 69. The antenna 63 is provided with the number of antennas required for MIMO-SDM communication.

The data control section 41 receives transmission data, control data and feedback information output from the feedback information control section 65 each to transmit to the base station apparatus, and each data is sequentially transmitted to the base station apparatus.

The modulation coding section 43 performs modulation processing and error correcting coding processing on the signal input from the data control section 41, and outputs each data to the Discrete Fourier Transform section 44. The Discrete Fourier Transform section 44 performs Fourier transform processing on the signal input from the modulation coding section 43, and generates a signal to perform SC-FDMA to output to the mapping section 45. The mapping section 45 performs mapping of the data input from the Discrete Fourier Transform section 44 on subcarriers assigned by the base station apparatus to output to the Inverse Fast Fourier Transform section 47.

The Inverse Fast Fourier Transform section 47 performs processing of Inverse Fast Fourier Transform on a symbol sequence input from the mapping section 45 to transform into a time-series baseband digital signal, and outputs the resultant signal to the radio transmission section 51. The output signal from the Inverse Fast Fourier Transform section 47 undergoes digital/analog conversion in the radio transmission section 51, is up-converted into a signal with a frequency suitable for transmission, and transmitted to the base station apparatus via the antenna.

The reception quality measuring section 71 measures reception quality of a signal received from the base station apparatus. Based on the information measured by the reception quality measuring section 71, the reception quality information generating section 67 generates reception quality information to transmit to the base station apparatus. The transmission signal preprocessing information generating section 68 calculates propagation path information using a signal received from the base station apparatus, and generates information of preprocessing on a transmission signal to be performed by the base station apparatus. The transmission signal number-of-sequence information generating section 68 calculates propagation path information using a signal received from the base station apparatus, and calculates the number of transmission sequences communicable with the base station apparatus.

The feedback information control section 65 manages control signals generated in the reception quality information generating section 67, transmission signal preprocessing information generating section 68, and transmission signal number-of-sequence information generating section 69 to output to the data control section 41. The feedback information managed in the feedback information control section 65 is not limited to generation and control of the signals described herein, and may include portions to manage other kinds of feedback information.

Figure 3:
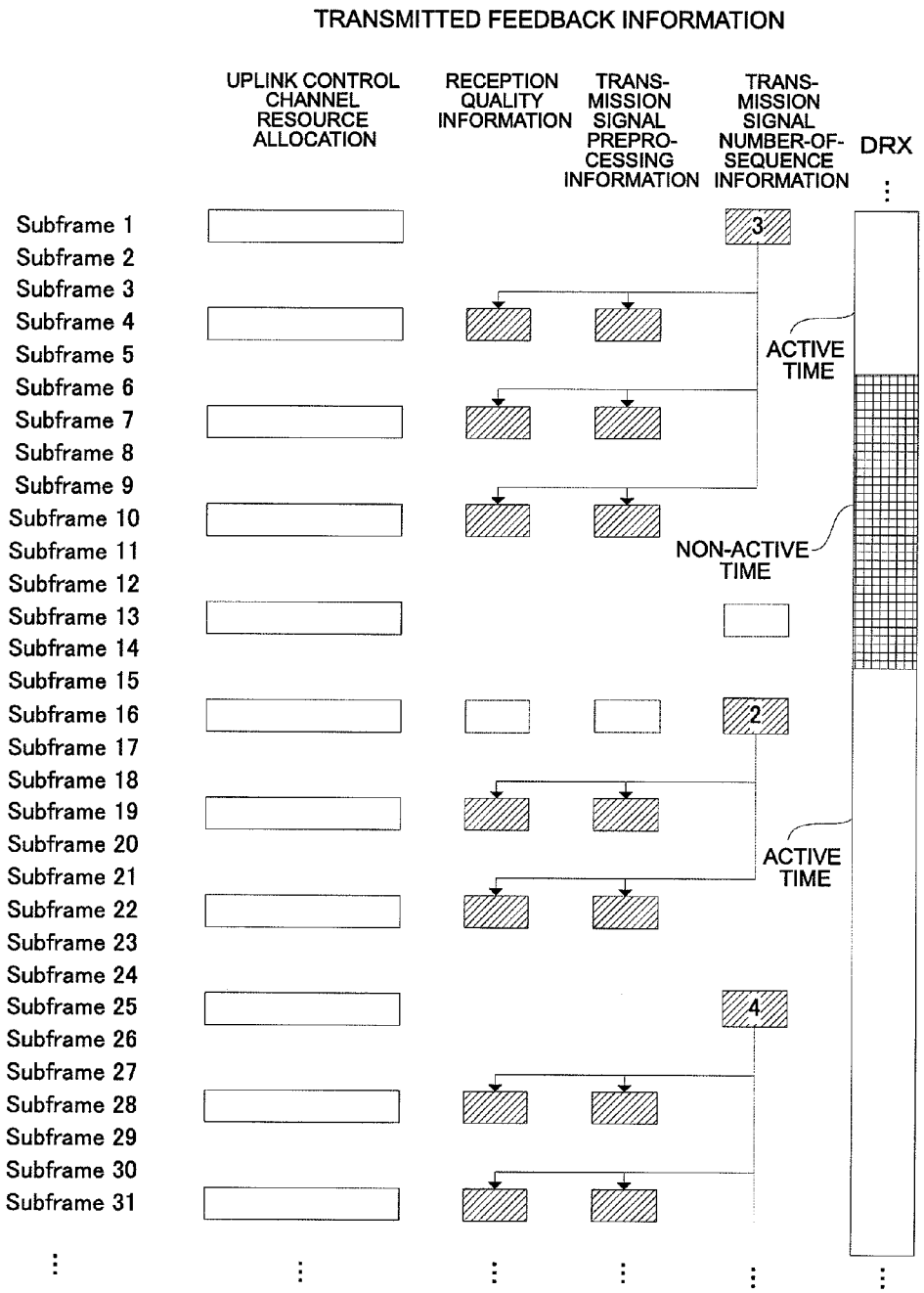
FIG. 3 is a diagram showing a timing chart to explain the flow of processing between the base station apparatus and mobile station apparatus in a mobile communication system according to Embodiment 1.
Figure 4:
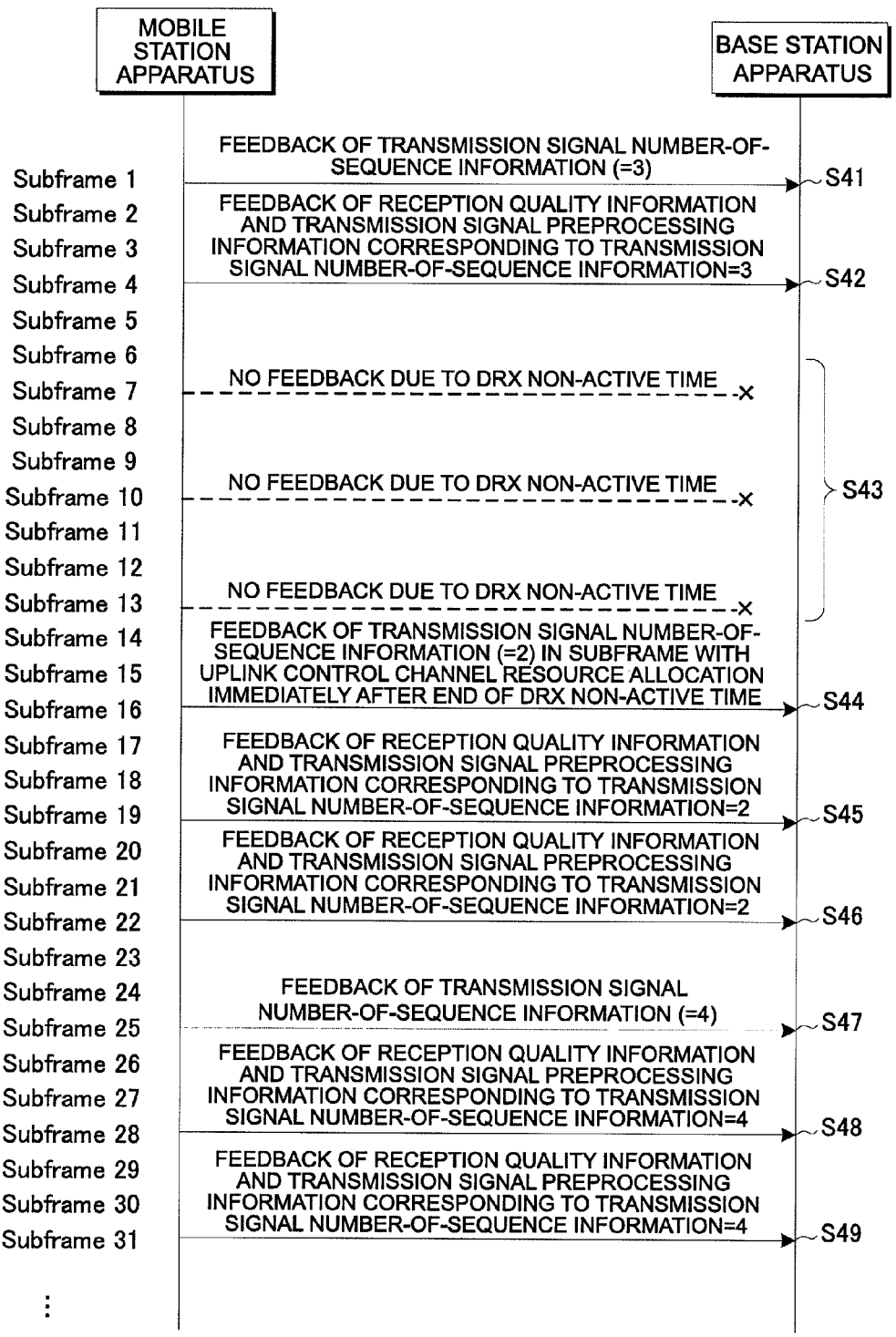
FIG. 4 is a sequence chart between the base station apparatus and mobile station apparatus in the mobile communication system according to Embodiment 1.

FIG. 3 is a diagram showing a timing chart to explain the flow of processing between the base station apparatus and mobile station apparatus in a mobile communication system according to Embodiment 1. FIG. 4 is a sequence chart between the base station apparatus and mobile station apparatus in the mobile communication system according to Embodiment 1. As shown in FIGS. 3 and 4, the reception quality information, transmission signal preprocessing information and transmission signal number-of-sequence information is transmitted only in subframes subjected to uplink control channel resource allocation that is performed by the base station apparatus on the mobile station apparatus. Further, herein, it is possible to concurrently transmit the reception quality information and transmission signal preprocessing information, but transmission signal number-of-sequence information is not transmitted concurrently with the reception quality information and transmission signal preprocessing information. In addition, in FIGS. 3 and 4, as an example, the uplink control channel resource allocation is made every three subframes, the transmission signal number-of-sequence information is transmitted once every four times the uplink control channel resource allocation is performed, and the reception quality information and transmission signal preprocessing information is periodically transmitted at the other uplink control channel resource allocation times.

The operation of the mobile communication system according to this Embodiment will be described below with reference to FIGS. 3 and 4. The base station apparatus is able to allocate uplink control channel resources for the mobile station apparatus to transmit the reception quality information, transmission signal preprocessing information and transmission signal number-of-sequence information permanently for the long term, for example, using a radio resource control signal (RRC signaling). First, the mobile station apparatus transmits the transmission signal number-of-sequence information to the base station apparatus as feedback in a subframe 1 first assigned uplink control channel resources (step S41). Herein, the mobile station apparatus transmits the transmission signal number-of-sequence information from the subframe 1, and a subframe in which the mobile station apparatus starts transmitting reception quality information, transmission signal preprocessing information and transmission signal number-of-sequence information can be set using an offset value transmitted from the base station apparatus.

In a subframe 4 in which next uplink control channel allocation is performed, the mobile station apparatus transmits to the base station apparatus the reception quality information and the transmission signal preprocessing information based on the transmission signal number-of-sequence information (=3) transmitted to the base station apparatus in the subframe 1 (step S42). Then, Non-active Time of DRX starts from a subframe 6, and downlink data transmission from the base station apparatus to mobile station apparatus is suspended (step S43). In subframes 7 and 10, uplink control channel resource allocation is performed, but the subframes are in a period of Non-active Time of DRX, and feedback is not given on the reception quality information and transmission signal preprocessing information.

Next, a subframe 13 is timing of transmitting the transmission signal number-of-sequence information as feedback, but is still in the period of Non-active Time of DRX, and in this subframe, feedback is not performed (step S43). The mobile station apparatus performs feedback of transmission signal number-of-sequence information (n=2) in a subframe 16 with next uplink control channel resource allocation after the end of the Non-active Time of DRX (step F44). Further, the subframe 16 is originally the feedback timing of reception quality information and transmission signal preprocessing information, but in this subframe, since the transmission signal number-of-sequence information is transmitted, feedback is not performed on the reception quality information and transmission signal preprocessing information. Then, in subframes 19 and 22 in which next uplink control channel allocation is performed, the mobile station apparatus transmits to the base station apparatus the reception quality information and transmission signal preprocessing information based on the transmission signal number-of-sequence information (=2) transmitted in the subframe 16 (steps S45, S46).

Next, in a subframe 25, the mobile station apparatus transmits the transmission signal number-of-sequence information to the base station apparatus as feedback (step S47). Then, in subframes 28 and 31 in which next resource allocation for uplink control channel is performed, the mobile station apparatus transmits to the base station apparatus the reception quality information and transmission signal preprocessing information based on the transmission signal number-of-sequence information (=4) transmitted to the base station apparatus in the subframe 25 (steps S48, S49).

Thus, according to the mobile communication system according to Embodiment 1 of the invention, even when a subframe that is the transmission timing of the transmission signal number-of-sequence information is in a period of Non-active Time of DRX and does not enable feedback of the transmission signal number-of-sequence information, since the transmission signal number-of-sequence information is transmitted in a subframe with next uplink control channel resource allocation after the end of the Non-active Time of DRX, the base station apparatus is able to know the correct transmission signal number-of-sequence information after the end of the Non-active Time of DRX, and to perform appropriate downlink communications based on the subsequently transmitted reception quality information and transmission signal preprocessing information.

In addition, in this Embodiment, in the subframe 16, the transmission signal number-of-sequence information is transmitted, instead of transmitting the reception quality information and the transmission signal preprocessing information, but it is possible to concurrently transmit all of the information. Further, it is described that whether or not to perform feedback is determined in the Active Time and Non-active Time of DRX, but whether or not to perform feedback may be determined in on-duration of DRX and opportunity for DRX.

Embodiment 2

A mobile communication system according to Embodiment 2 of the invention will be described below with reference to drawings. In the mobile communication system according to Embodiment 2 of the invention, the mobile station apparatus sets the number of transmission sequences at a predetermined value and transmits the reception quality information and the transmission signal preprocessing information corresponding to this value to the base station apparatus as feedback until next feedback of transmission signal number-of-sequence information is performed after Non-active Time of DRX ends when feedback of the transmission signal number-of-sequence information cannot be performed due to the Non-active Time of DRX, and in this respect, the system according to Embodiment 2 differs from the mobile communication system according to Embodiment 1. In addition, the configurations of the base station apparatus and mobile station apparatus are the same as in FIGS. 1 and 2.

Figure 5:
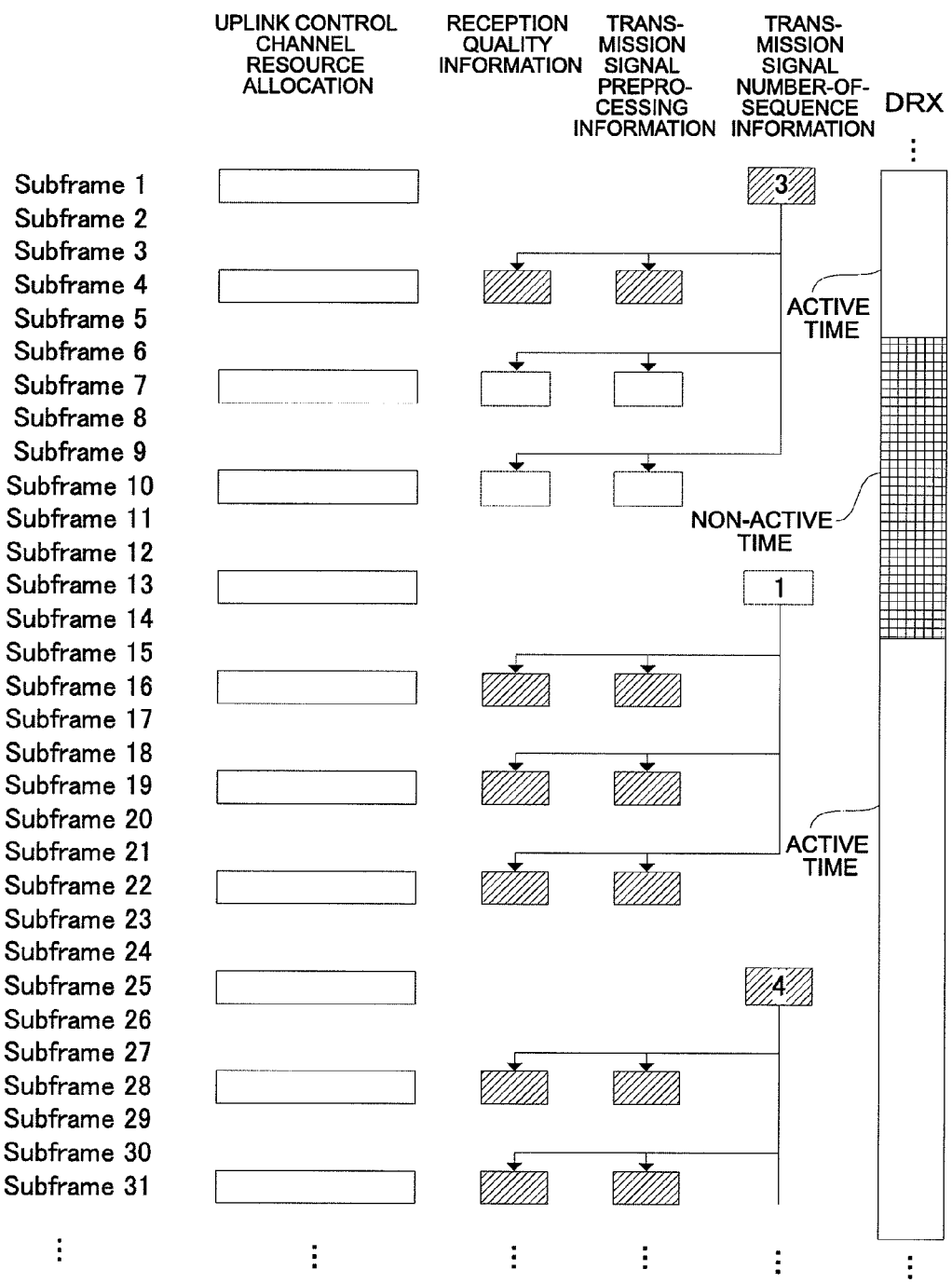
FIG. 5 is a diagram showing a timing chart to explain the flow of processing between the base station apparatus and mobile station apparatus in a mobile communication system according to Embodiment 2.
Figure 6:
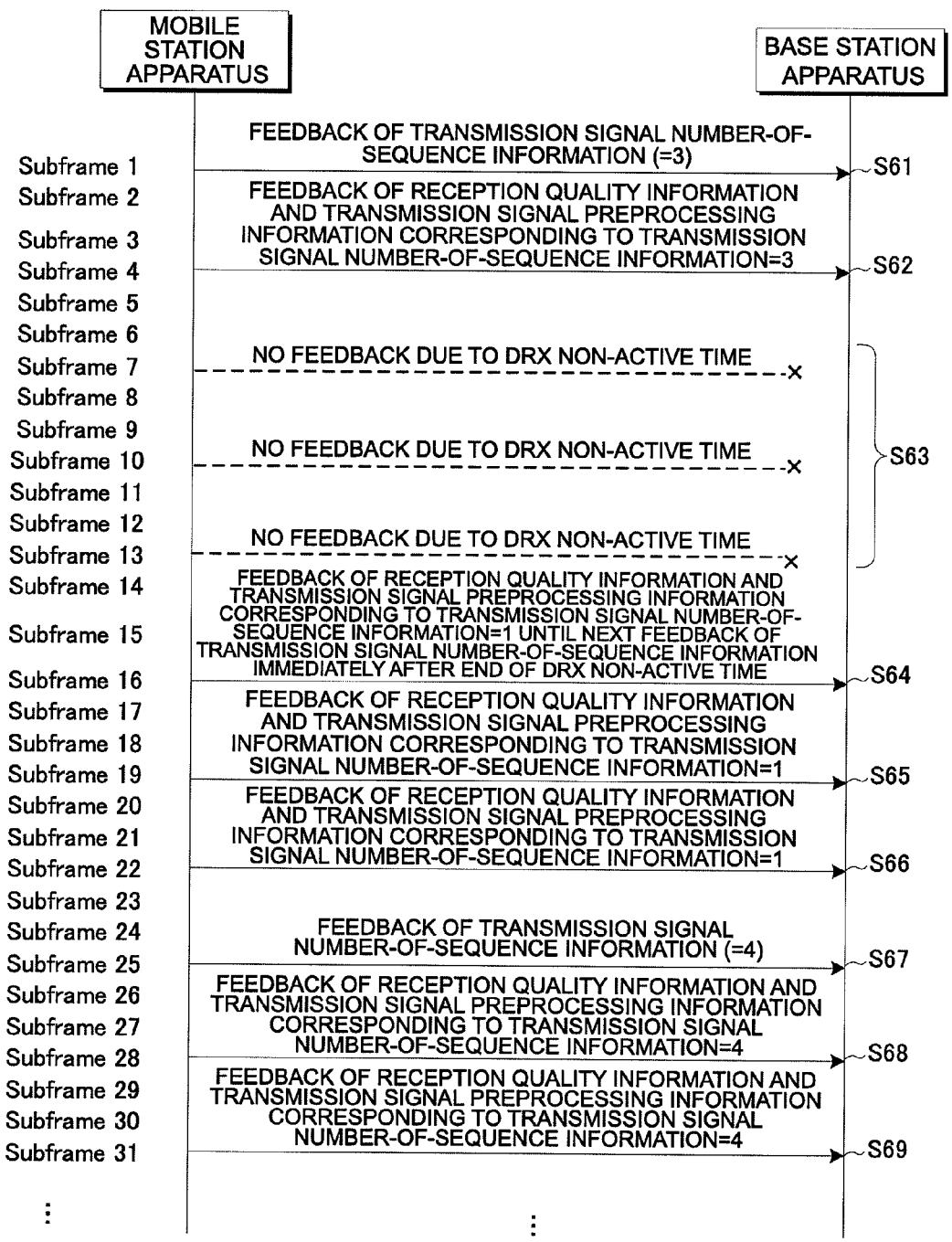
FIG. 6 is a sequence chart between the base station apparatus and mobile station apparatus in the mobile communication system according to Embodiment 2.

FIG. 5 is a diagram showing a timing chart to explain the flow of processing between the base station apparatus and mobile station apparatus in the mobile communication system according to Embodiment 2. FIG. 6 is a sequence chart between the base station apparatus and mobile station apparatus in the mobile communication system according to Embodiment 2. As shown in FIGS. 5 and 6, also in the mobile communication system according to this Embodiment, the operations of subframes 1 to 13 (steps S61 to S63) are the same as the operations in Embodiment 1, and descriptions thereof are omitted.

Next, the mobile station apparatus performs the following operation for a period during which Non-active Time of DRX ends and next feedback of the transmission signal number-of-sequence information (n=4) is performed in a subframe 25. In other words, in subframes 16, 19 and 22 in which uplink control channel resource allocation occurs, the mobile station apparatus transmits to the base station apparatus the reception quality information and transmission signal preprocessing information based on the predetermined transmission signal number-of-sequence information (steps S64, S65, S66). Herein, the predetermined transmission signal number-of-sequence information is, for example, the number of transmission signal sequences=1 (minimum value) that minimizes the information amount of the feedback information from the mobile station apparatus, or the number of transmission signal sequences=4 (maximum value) that enables the propagation path to be used most efficiently (enables maximum throughput to be obtained) and the like, and can be defined by specifications or the like in advance between the base station apparatus and mobile station apparatus.

Then, for the reception quality information and transmission signal preprocessing information sent as feedback for a period during which the Non-active Time of DRX ends and the mobile station apparatus gives next feedback of the transmission signal number-of-sequence information, the base station apparatus performs the processing while regarding the transmission signal number-of-sequence information as the predetermined value (for example, the number of transmission signal sequences=1 (minimum value) or the number of transmission signal sequences=4 (maximum value)). Then, after receiving feedback of the transmission signal number-of-sequence information (n=4) in the subframe 25 from the mobile station apparatus (step S67), the base station apparatus receives feedback of the reception quality information and transmission signal preprocessing information based on the received transmission signal number-of-sequence information (=4) in subframes 28 and 31 (steps S68, S69).

In addition, FIGS. 5 and 6 describe setting a predetermined value of transmission signal number-of-sequence information at "1" as an example for a period during which Non-active Time of DRX ends and next feedback of the transmission signal number-of-sequence information is performed, but as described above, such a value can be defined by specifications or the like in advance. Further, a case occurs where the transmission signal preprocessing information is not necessary such as a case that a value of transmission signal number-of-sequence information corresponds to transmission diversity of closed loop control. In this case, the mobile station apparatus transmits only the reception quality information, and the base station apparatus performs the processing by regarding the reception quality information as being transmitted only.

Thus, according to the mobile communication system according to Embodiment 2 of the invention, even when a subframe that is the transmission timing of the transmission signal number-of-sequence information is in a period of Non-active Time of DRX and does not enable feedback of the transmission signal number-of-sequence information, feedback of the reception quality information and the transmission signal preprocessing information is given based on a predetermined value of the transmission signal number-of-sequence information until the mobile station apparatus transmits next feedback of transmission signal number-of-sequence information after the Non-active Time of DRX ends, and it is thereby possible to prevent the occurrence of burst error due to communications using the number of transmission signal sequences that is not suitable for propagation path conditions.

Embodiment 3

A mobile communication system according to Embodiment 3 of the invention will be described below with reference to drawings. In the mobile communication system according to Embodiment 3 of the invention, for a period during which Non-active Time of DRX ends and next feedback of the transmission signal number-of-sequence information is performed, the mobile station apparatus does not transmit feedback of the reception quality information and the transmission signal preprocessing information to the base station apparatus, and for this period, the base station apparatus transmits downlink data using the predetermined number of transmission signal sequences. In this respect, Embodiment 3 differs from Embodiments 1 and 2. In addition, the configurations of the base station apparatus and mobile station apparatus are the same as in FIGS. 1 and 2.

Figure 7:
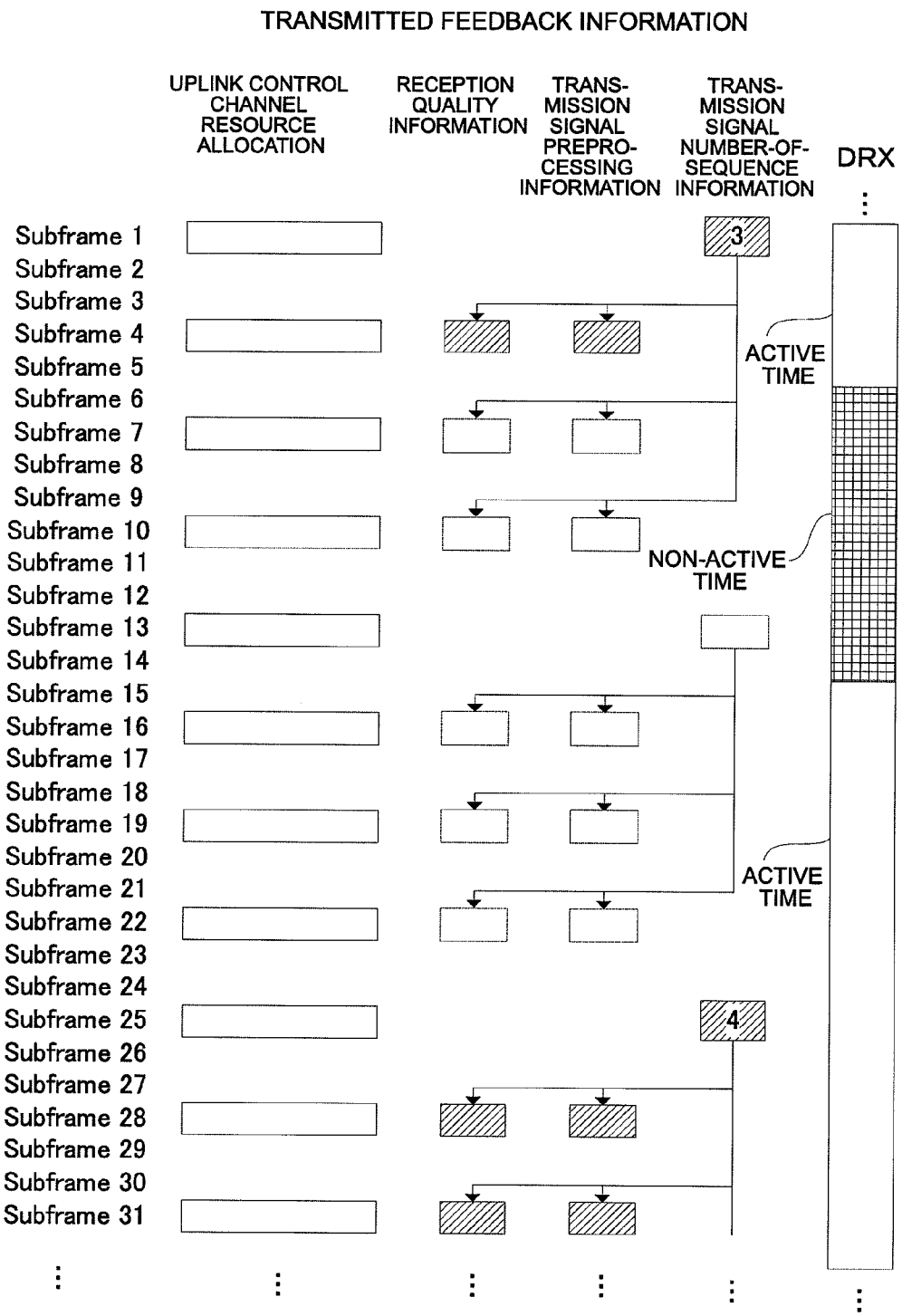
FIG. 7 is a diagram showing a timing chart to explain the flow of processing between the base station apparatus and mobile station apparatus in a mobile communication system according to Embodiment 3.
Figure 8:
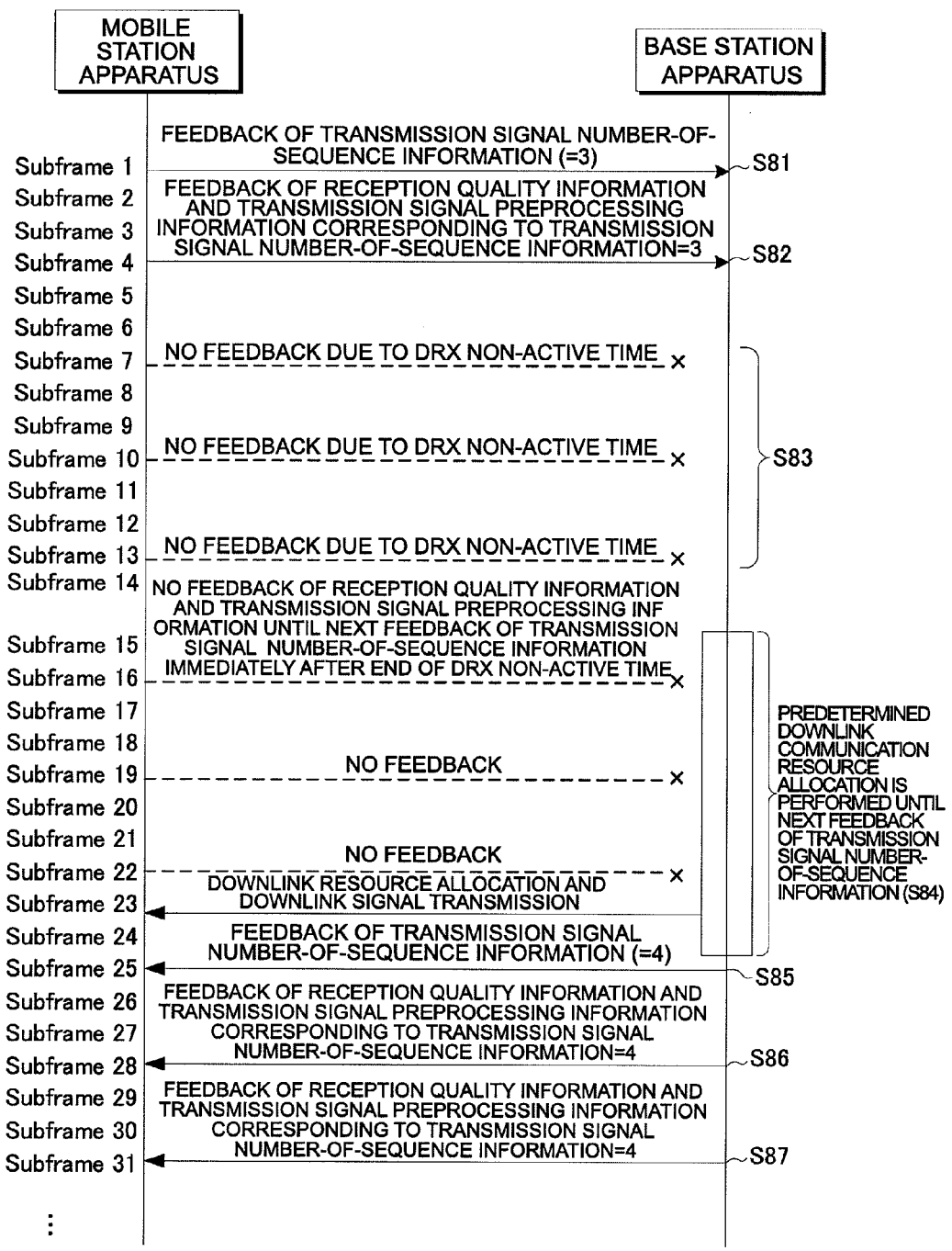
FIG. 8 is a sequence chart between the base station apparatus and mobile station apparatus in the mobile communication system according to Embodiment 3.

FIG. 7 is a diagram showing a timing chart to explain the flow of processing between the base station apparatus and mobile station apparatus in the mobile communication system according to Embodiment 3. FIG. 8 is a sequence chart between the base station apparatus and mobile station apparatus in the mobile communication system according to Embodiment 3. As shown in FIGS. 7 and 8, also in the mobile communication system according to this Embodiment, the operations of subframes 1 to 13 (steps S81 to S83) are the same as the operations in Embodiment 1, and descriptions thereof are omitted.

Next, the mobile station apparatus does not perform feedback of the reception quality information and the transmission signal preprocessing information for a period during which Non-active Time of DRX ends and next feedback of the transmission signal number-of-sequence information (n=4) is performed in a subframe 25 even in subframes (subframes 16, 19, 22) assigned uplink control channel resources (step S84). The base station apparatus performs transmission of downlink data in predetermined form for the period during which Non-active Time of DRX ends and next feedback of the transmission signal number-of-sequence information is performed.

More specifically, in a subframe 23, the base station apparatus transmits downlink signal allocation to the mobile station apparatus on the control channel, and further transmits a downlink signal in resources configured in the allocation. In this subframe, the base station apparatus transmits the signal using the predetermined number of transmission signal sequences. Herein, the predetermined form is the number of transmission signal sequences=1 (minimum value) that minimizes the information amount of the feedback information from the mobile station apparatus, the number of transmission signal sequences=4 (maximum value) that enables the propagation path to be used most efficiently (enables maximum throughput to be obtained) and the like, and can be defined by specifications or the like in advance between the base station apparatus and mobile station apparatus.

Then, after receiving feedback of the transmission signal number-of-sequence information (n=4) in the subframe 25 from the mobile station apparatus (step S85), the base station apparatus receives feedback of the reception quality information and transmission signal preprocessing information based on the received transmission signal number-of-sequence information (=4) in subframes 28 and 31 (steps S86, S87). The base station apparatus implements suitable downlink data transmission corresponding to the transmission number-of-sequence information, reception quality information and transmission signal preprocessing information.

Thus, according to the mobile communication system according to Embodiment 3 of the invention, even when a subframe that is the transmission timing of the transmission signal number-of-sequence information is in a period of Non-active Time of DRX and does not enable feedback of the transmission signal number-of-sequence information, for a period during which the Non-active Time of DRX ends and next feedback of the transmission signal number-of-sequence information is performed, the mobile station apparatus does not perform feedback of the reception quality information and the transmission signal preprocessing information, the base station apparatus transmits downlink data in predetermined form, and it is thereby possible to reduce consumption of power to transmit the feedback information that is not used.

Embodiment 4

A mobile communication system according to Embodiment 4 of the invention will be described below with reference to drawings. In the mobile communication system according to Embodiment 4 of the invention, for a period during which Non-active Time of DRX ends and next feedback of the transmission signal number-of-sequence information is performed, even when the mobile station apparatus performs feedback of the reception quality information and the transmission signal preprocessing information, the base station apparatus abandons (disables) the information and transmits downlink data in predetermined form. In this respect, Embodiment 4 differs from Embodiments 1, 2 and 3. In addition, the configurations of the base station apparatus and mobile station apparatus are the same as in FIGS. 1 and 2.

Figure 9:
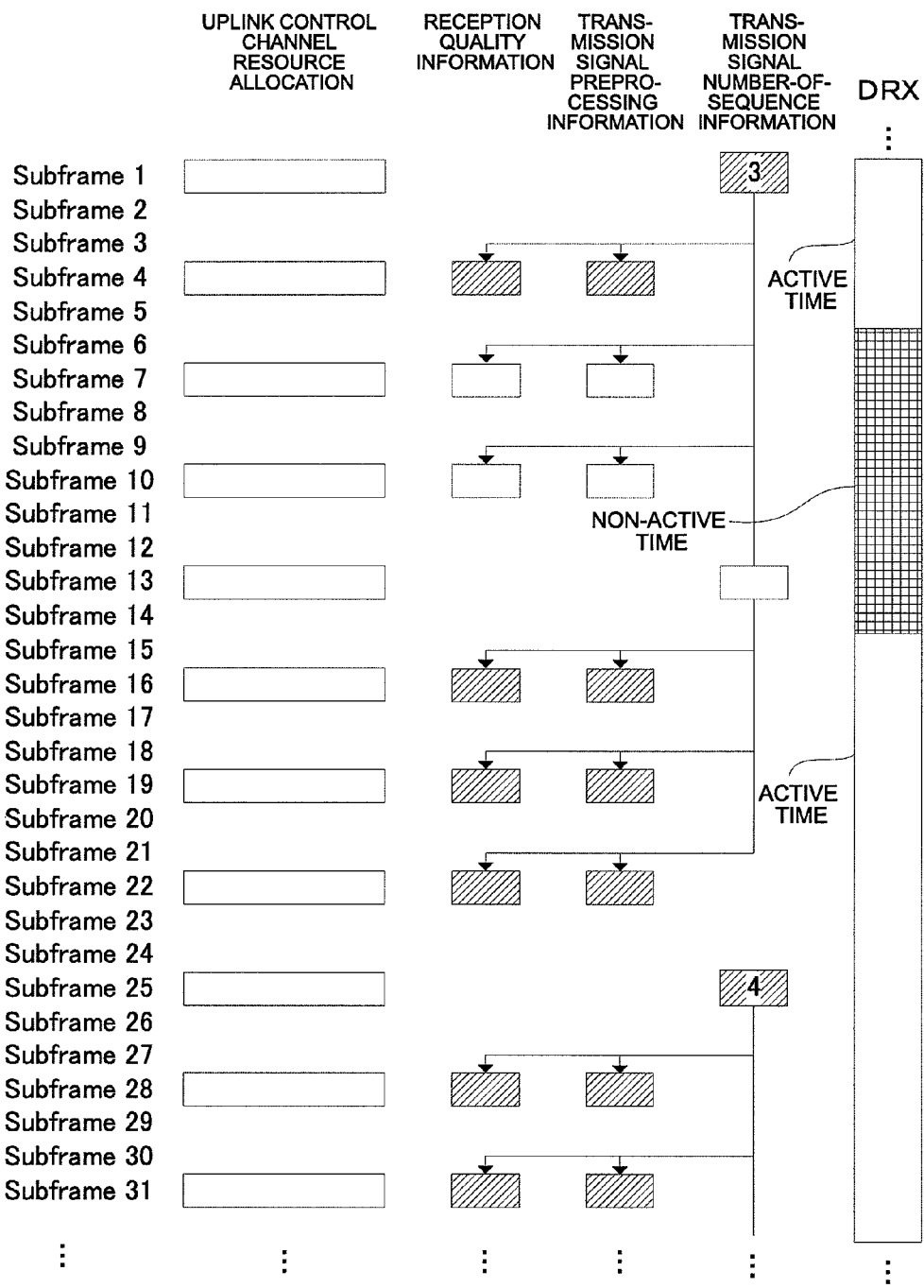
FIG. 9 is a diagram showing a timing chart to explain the flow of processing between the base station apparatus and mobile station apparatus in a mobile communication system according to Embodiment 4.
Figure 10:
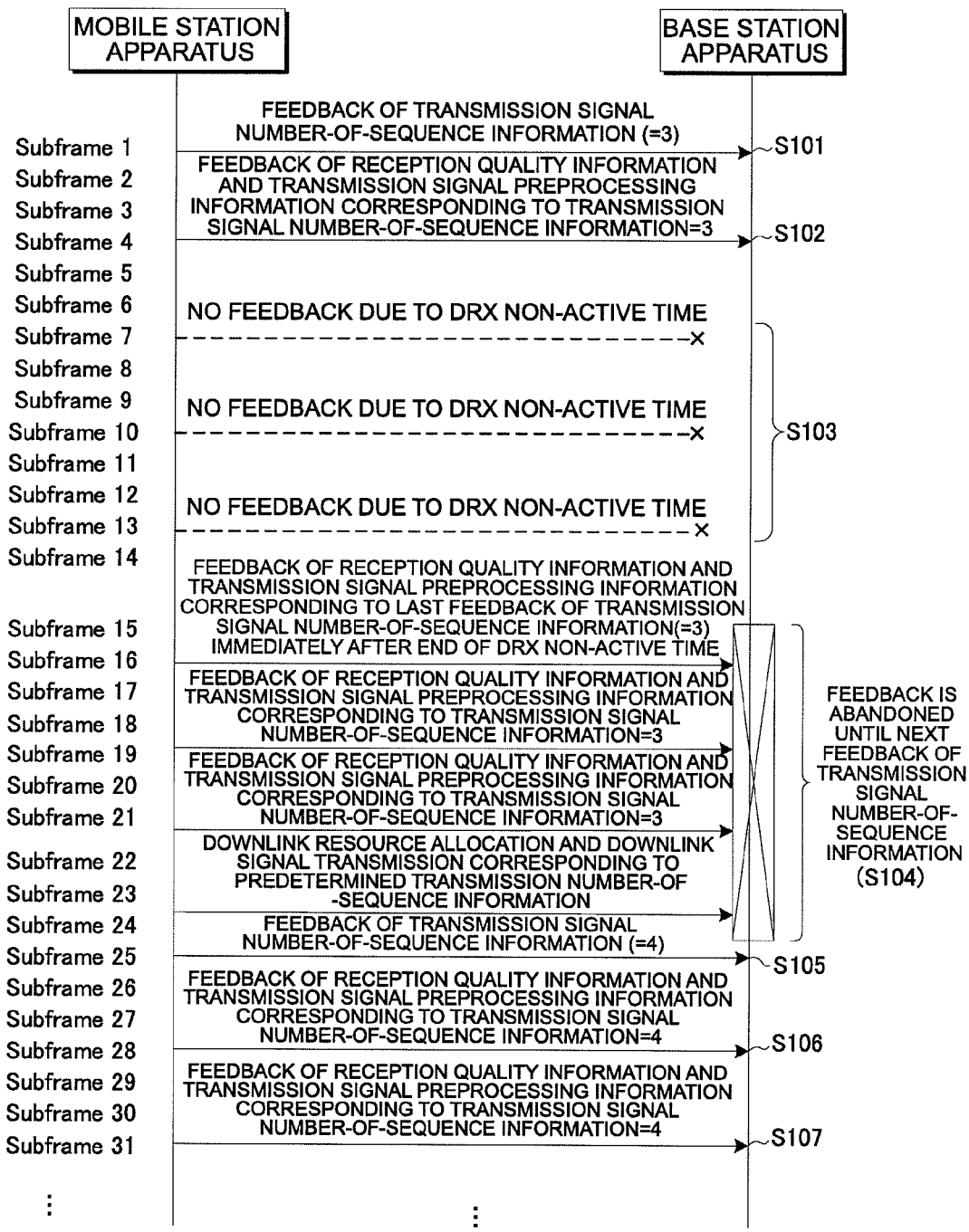
FIG. 10 is a sequence chart between the base station apparatus and mobile station apparatus in the mobile communication system according to Embodiment 4.
Figure 11:
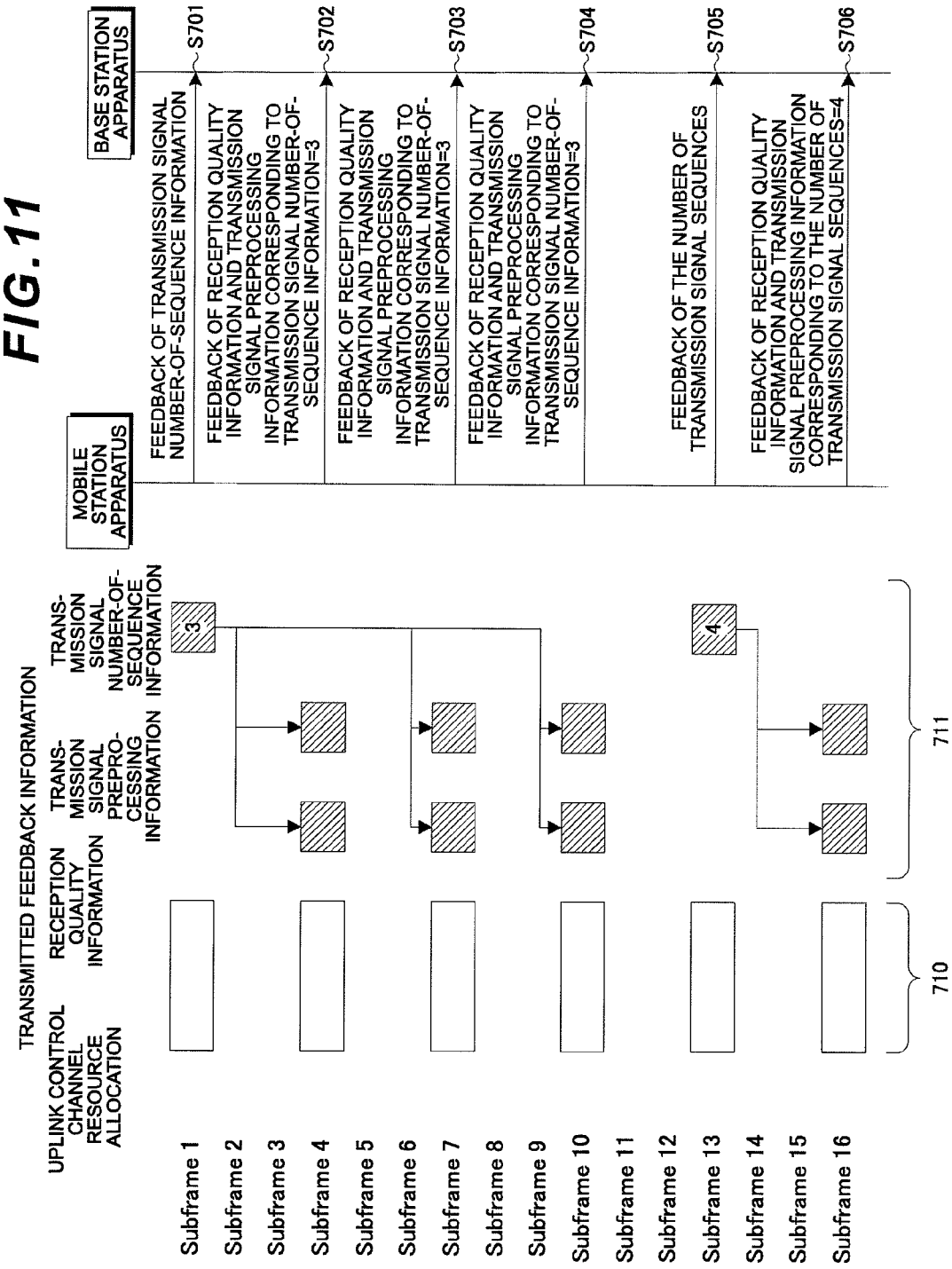
FIG. 11 contains a timing chart and sequence chart showing the flow of processing between a base station apparatus and mobile station apparatus in a conventional mobile communication system.
Figure 12:
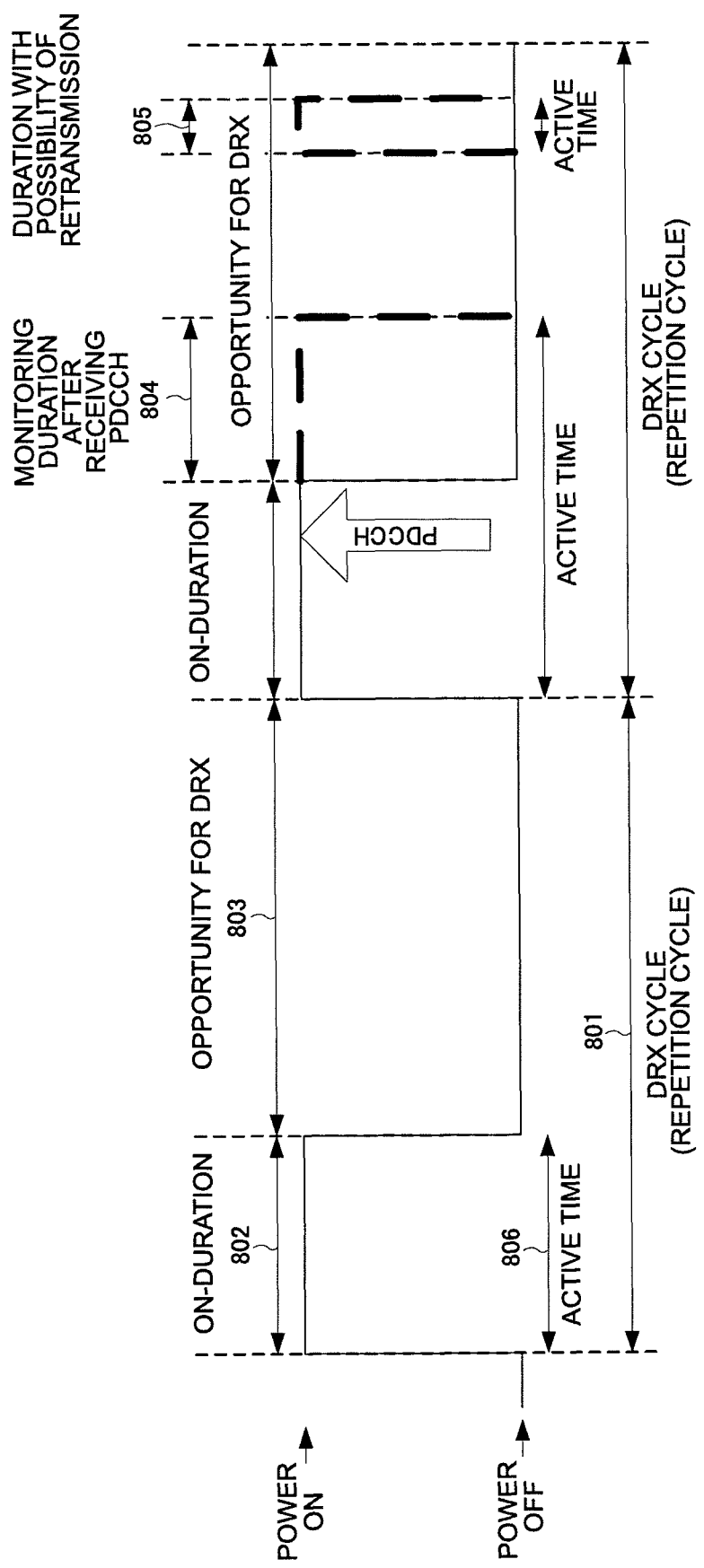
FIG. 12 is a diagram showing the outline of DRX control.

FIG. 9 is a diagram showing a timing chart to explain the flow of processing between the base station apparatus and mobile station apparatus in the mobile communication system according to Embodiment 4. FIG. 10 is a sequence chart between the base station apparatus and mobile station apparatus in the mobile communication system according to Embodiment 4. As shown in FIGS. 9 and 10, also in the mobile communication system according to this Embodiment, the operations of subframes 1 to 13 (steps S101 to S103) are the same as the operations in Embodiment 1, and descriptions thereof are omitted.

Next, the mobile station apparatus performs the following operation for a period during which Non-active Time of DRX ends and next feedback of the transmission signal number-of-sequence information is performed in a subframe 25. In other words, in subframes (subframes 16, 19 and 22) in which uplink control channel resource allocation is performed, the mobile station apparatus transmits to the base station apparatus the reception quality information and transmission signal preprocessing information based on the last feedback (subframe 1) of transmission signal number-of-sequence information (=3) (step S104). For the period during which Non-active Time of DRX ends and next feedback of the transmission signal number-of-sequence information is transmitted from the mobile station apparatus, the base station apparatus disables and abandons the reception quality information and transmission signal preprocessing information fed back by the mobile station apparatus, and performs transmission of downlink data in predetermined form (step S104).

More specifically, in a subframe 23, the base station apparatus transmits downlink signal allocation to the mobile station apparatus on the control channel, and further transmits a downlink signal in the resources configured in the allocation. In this subframe, the base station apparatus abandons the received number of transmission signal sequences, and transmits the signal using the predetermined number of transmission signal sequences. Herein, the predetermined form is the number of transmission signal sequences=1 (minimum value) that minimizes the information amount of the feedback information from the mobile station apparatus, the number of transmission signal sequences=4 (maximum value) that enables the propagation path to be used most efficiently (enables maximum throughput to be obtained) and the like, and can be defined by specifications or the like in advance between the base station apparatus and mobile station apparatus.

Then, after receiving feedback of the transmission signal number-of-sequence information (n=4) in the subframe 25 (step S105) from the mobile station apparatus, the base station apparatus receives feedback of the reception quality information and transmission signal preprocessing information based on the received transmission signal number-of-sequence information (=4) in subframes 28 and 31 (steps S106, S107). The base station apparatus performs suitable downlink data transmission according to the transmission number-of-sequence information, reception quality information and transmission signal preprocessing information.

Thus, according to the mobile communication system according to Embodiment 4 of the invention, even when a subframe that is the transmission timing of the transmission signal number-of-sequence information is in a period of Non-active Time of DRX and does not enable feedback of the transmission signal number-of-sequence information, for a period during which the Non-active Time of DRX ends and next feedback of the transmission signal number-of-sequence information is performed, even in the case that the mobile station apparatus performs feedback of the reception quality information and the transmission signal preprocessing information, the base station apparatus transmits downlink data in predetermined form. It is thereby possible to prevent the occurrence of burst error due to communications using the number of transmission signal sequences that is not suitable for propagation path conditions.

Embodiment 5

Embodiments 1 to 4 as described above show the case as an example that DRX causes the reason of occurrence of the situation that the mobile station apparatus cannot feed back the transmission signal number-of-sequence information, but the reason is not limited to DRX. Also when the situation occurs that the transmission signal number-of-sequence information cannot be transmitted due to reasons other than the DRX, the mobile station apparatus and base station apparatus are able to apply Embodiments 1 to 4 as described above. For example, when such a situation occurs that the mobile station apparatus cannot transmit the transmission signal number-of-sequence information because of transmitting a signal (hereinafter, referred to as a scheduling request) for requesting resource allocation to the base station apparatus, it is possible to apply Embodiments 1 to 4 as described above. When such a situation occurs that the mobile station apparatus cannot transmit the transmission signal number-of-sequence information because of transmitting another uplink control signal (for example, scheduling request) in a subframe in which uplink control channel resource allocation is performed to transmit the transmission signal number-of-sequence information, it is possible to apply Embodiments 1 to 4 as described above.

This example will be described using FIGS. 3 and 4 showing Embodiment 1. In addition, configurations of the base station apparatus and mobile station apparatus are the same as in FIGS. 1 and 2. As in Embodiment 1, first, the mobile station apparatus transmits the transmission signal number-of-sequence information to the base station apparatus as feedback in a subframe 1 first assigned uplink control channel resources. Subsequently, in subframes 4, 7 and 10 in which next uplink control channel allocation is performed, the mobile station apparatus transmits to the base station apparatus the reception quality information and the transmission signal preprocessing information based on the transmission signal number-of-sequence information (=3) transmitted to the base station apparatus in the subframe 1. Embodiment 5 does not consider DRX.

When such a situation occurs that the mobile station apparatus cannot transmit the transmission signal number-of-sequence information (=2) because of transmitting another uplink control signal (for example, scheduling request) at the timing of a subframe 13 in which the base station apparatus performs uplink control channel resource allocation so as to transmit the transmission signal number-of-sequence information, the mobile station apparatus performs feedback of the transmission signal number-of-sequence information (=2) in a subframe 16 in which uplink control channel resource allocation is next performed. As well as Embodiment 1, although the subframe 16 is originally the timing of feedback of the reception quality information and transmission signal preprocessing information, the mobile station apparatus does not perform the feedback because of transmitting the transmission signal number-of-sequence information. Then, in subframes 19 and 22 in which next uplink control channel allocation is performed, the mobile station apparatus transmits to the base station apparatus the reception quality information and transmission signal preprocessing information based on the transmission signal number-of-sequence information (=2) that is the feedback in the subframe 16.

Similarly, when such a situation occurs that the mobile station apparatus cannot transmit the transmission signal number-of-sequence information (for example, in the case of transmitting another uplink control signal), as described in Embodiment 2, the mobile station apparatus is capable of transmitting feedback of the reception quality information and transmission signal preprocessing information to the base station apparatus while setting the number of transmission sequences at a predetermined value until next feedback of the transmission signal number-of-sequence information is performed in a subframe in which uplink control channel resource allocation is performed.

Further, when such a situation occurs that the mobile station apparatus cannot transmit the transmission signal number-of-sequence information (for example, in the case of transmitting another uplink control signal), as described in Embodiment 3, the mobile station apparatus does not perform feedback of the reception quality information and transmission signal preprocessing information until next feedback of the transmission signal number-of-sequence information is performed in a subframe in which uplink control channel resource allocation is performed, and the base station apparatus is capable of performing downlink data transmission using the predetermined number of transmission signal sequences.

Furthermore, when such a situation occurs that the mobile station apparatus cannot transmit the transmission signal number-of-sequence information (for example, in the case of transmitting another uplink control signal), as described in Embodiment 4, during a period until the mobile station apparatus performs next feedback of the transmission signal number-of-sequence information in a subframe in which uplink control channel resource allocation is performed, even when the mobile station apparatus transmits the reception quality information and transmission signal preprocessing information as feedback, the base station apparatus abandons (disables) the information and is capable of transmitting downlink data in predetermined form.

Thus, according to the mobile communication system according to Embodiment 5 of the invention, when such a situation occurs that the mobile station apparatus cannot transmit the transmission signal number-of-sequence information due to the reason (for example, transmission of another uplink control signal) except DRX, the base station apparatus is capable of knowing the correct transmission signal number-of-sequence information, and performing appropriate downlink communications based on the subsequently transmitted reception quality information and transmission signal preprocessing information.

In aforementioned Embodiments 1 to 5, scheduling is performed so as to transmit the reception quality information and transmission signal preprocessing information at the same timing, but it is possible to perform the similar processing also in the case of performing scheduling so that the information is in different subframes.

(A) A mobile station apparatus according to this Embodiment is a mobile station apparatus having a plurality of antennas to perform radio communications with a base station apparatus using all or a part of the plurality of antennas, has a feedback information generating section that generates feedback information including reception quality information indicative of reception quality, transmission signal preprocessing information used by the base station apparatus in performing preprocessing on a transmission signal, and transmission signal number-of-sequence information indicative of multiplexed transmission signal sequences, and a transmitting section that periodically transmits the generated feedback information to the base station apparatus, and is characterized in that when the transmitting section does not transmit the transmission signal number-of-sequence information with communication resources periodically allocated from the base station apparatus so as to transmit the transmission signal number-of-sequence information, the transmitting section transmits the transmission signal number-of-sequence information to the base station apparatus with communication resources enabling transmission of the feedback information allocated from the base station apparatus subsequently to the communication resources.

Thus, when the mobile station apparatus does not transmit the transmission signal number-of-sequence information with communication resources periodically allocated by the base station apparatus so as to transmit the transmission signal number-of-sequence information, the mobile station apparatus transmits the transmission signal number-of-sequence information to the base station apparatus with communication resources enabling transmission of the feedback information allocated from the base station apparatus subsequently to the communication resources. Therefore, for example, even when the mobile station apparatus cannot transmit feedback of the transmission signal number-of-sequence information to the base station apparatus because a subframe that is the transmission timing of transmission signal number-of-sequence information is in a period of Nonactive Time of DRX, the mobile station apparatus is capable of performing the feedback in a subframe with uplink control channel resource allocation subsequent to the end of the Nonactive Time of DRX. By this means, the base station apparatus is capable of knowing the correct transmission signal number-of-sequence information after the end of the Nonactive Time of DRX, and performing appropriate downlink communication resource allocation based on the subsequently transmitted reception quality information and transmission signal preprocessing information.

(B) Further, a mobile station apparatus according to this Embodiment is a mobile station apparatus having a plurality of antennas to perform radio communications with a base station apparatus using all or a part of the plurality of antennas, has a feedback information generating section that generates feedback information including reception quality information indicative of reception quality, transmission signal preprocessing information used by the base station apparatus in performing preprocessing on a transmission signal, and transmission signal number-of-sequence information indicative of multiplexed transmission signal sequences, and a transmitting section that periodically transmits the generated feedback information to the base station apparatus, and is characterized in that when the transmitting section does not transmit the transmission signal number-of-sequence information with communication resources periodically allocated from the base station apparatus so as to transmit the transmission signal number-of-sequence information, the feedback information generating section generates the reception quality information and transmission signal preprocessing information corresponding to the beforehand defined number of transmission signal sequences during a period until communication resources periodically allocated from the base station apparatus so as to transmit the transmission signal number-of-sequence information subsequent to the communication resources, and the transmitting section transmits at least one of the transmission equality information and transmission signal preprocessing information corresponding to the beforehand defined number of transmission signal sequences to the base station apparatus.

Thus, when the mobile station apparatus does not transmit the transmission signal number-of-sequence information with communication resources periodically allocated from the base station apparatus so as to transmit the transmission signal number-of-sequence information, the mobile station apparatus transmits at least one of the transmission equality information and transmission signal preprocessing information corresponding to the beforehand defined number of transmission signal sequences to the base station apparatus during a period until communication resources periodically allocated from the base station apparatus so as to transmit the transmission signal number-of-sequence subsequent to the communication resources. Therefore, for example, even when the mobile station apparatus cannot perform feedback of the transmission signal number-of-sequence information because a subframe that is the transmission timing of transmission signal number-of-sequence information is in a period of Non-active Time of DRX, the mobile station apparatus is capable of performing feedback of the reception quality information and transmission preprocessing information corresponding to a predetermined fixed value of the transmission signal number-of-sequence information until next feedback of subsequent transmission signal number-of-sequence information from the mobile station apparatus after the end of the Non-active Time of DRX. By this means, the base station apparatus is capable of performing appropriate downlink communication resource allocation.

(C) Further, a mobile station apparatus according to this Embodiment is a mobile station apparatus having a plurality of antennas to perform radio communications with a base station apparatus using all or a part of the plurality of antennas, has a feedback information generating section that generates feedback information including reception quality information indicative of reception quality, transmission signal preprocessing information used by the base station apparatus in performing preprocessing on a transmission signal, and transmission signal number-of-sequence information indicative of multiplexed transmission signal sequences, and a transmitting section that periodically transmits the generated feedback information to the base station apparatus, and is characterized in that when the transmitting section does not transmit the transmission signal number-of-sequence information with communication resources periodically allocated from the base station apparatus so as to transmit the transmission signal number-of-sequence information, the transmitting section halts transmission of the feedback information for a period until communication resources periodically allocated from the base station apparatus so as to transmit the transmission signal number-of-sequence information subsequent to the communication resources.

Thus, when the mobile station apparatus does not transmit the transmission signal number-of-sequence information with communication resources periodically allocated from the base station apparatus so as to transmit the transmission signal number-of-sequence information, the mobile station apparatus halts transmission of the feedback information during a period until communication resources periodically allocated from the base station apparatus so as to transmit the transmission signal number-of-sequence information subsequent to the communication resources. Therefore, even when the mobile station apparatus cannot perform feedback of the transmission signal number-of-sequence information because a subframe that is the transmission timing of transmission signal number-of-sequence information is in a period of Non-active Time of DRX, the mobile station apparatus does not perform feedback of the reception quality information and transmission signal preprocessing information for a period during which the Non-active Time of DRX ends and next feedback is performed on the transmission signal number-of-sequence information, and the base station apparatus is capable of performing downlink communication resource allocation in predetermined form. By this means, downlink communications can be performed as normally as possible.

(D) Further, a base station apparatus according to this Embodiment is a base station apparatus having a plurality of antennas to perform radio communications with a mobile station apparatus using all or a part of the plurality of antennas, has a scheduler section that periodically allocates communication resources to the mobile station apparatus in order for the mobile station apparatus to transmit transmission signal number-of-sequence information, and a transmission signal number-of-sequence information control section that determines the number of transmission signal sequences at least based on the transmission signal number-of-sequence information transmitted from the mobile station apparatus, and is characterized in that when the mobile station apparatus does not transmit the transmission signal number-of-sequence information with the communication resources, the transmission signal number-of-sequence information control section determines the number of transmission signal sequences based on information transmitted with communication resources enabling transmission of the feedback information allocated subsequently to the communication resources.

Thus, when the mobile station apparatus does not transmit the transmission signal number-of-sequence information with the communication resources, since the number of transmission signal sequences is determined based on information transmitted with communication resources enabling transmission of the feedback information allocated subsequently to the communication resources. Therefore, for example, even when the mobile station apparatus cannot transmit feedback of the transmission signal number-of-sequence information to the base station apparatus because a subframe that is the transmission timing of transmission signal number-of-sequence information is in a period of Non-active Time of DRX, the feedback can be given in a subframe in which uplink control channel resource allocation is performed subsequently to the end of the Non-active Time of DRX. By this means, the base station apparatus is capable of knowing the correct transmission signal number-of-sequence information after the end of the Non-active Time of DRX, and performing appropriate downlink communication resource allocation based on the subsequently transmitted reception quality information and transmission signal preprocessing information.

(E) Further, a base station apparatus according to this embodiment is a base station apparatus having a plurality of antennas to perform radio communications with a mobile station apparatus using all or a part of the plurality of antennas, has a scheduler section that periodically allocates communication resources to the mobile station apparatus in order for the mobile station apparatus to transmit transmission signal number-of-sequence information, and a transmission signal number-of-sequence information control section that determines the number of transmission signal sequences at least based on the transmission signal number-of-sequence information transmitted from the mobile station apparatus, and is characterized in that when the mobile station apparatus does not transmit the transmission signal number-of-sequence information with the communication resources, the transmission signal number-of-sequence information control section uses the beforehand defined number of transmission signal sequences as the number of transmission signal sequences until communication resources periodically allocated to transmit the transmission signal number-of-sequence information subsequent to the communication resources.

Thus, when the mobile station apparatus does not transmit the transmission signal number-of-sequence information with the communication resources, the beforehand defined number of transmission signal sequences is used as the number of transmission signal sequences until communication resources periodically allocated to transmit the transmission signal number-of-sequence information subsequent to the communication resources. Therefore, for example, even when the mobile station apparatus cannot perform feedback of the transmission signal number-of-sequence information because a subframe that is the transmission timing of transmission signal number-of-sequence information is in a period of Non-active Time of DRX, it is possible to use the reception quality information and transmission preprocessing information corresponding to a predetermined fixed value of the transmission signal number-of-sequence information until feedback of subsequent transmission signal number-of-sequence information is given from the mobile station apparatus after the end of the Non-active Time of DRX. By this means, the base station apparatus is capable of performing appropriate downlink communication resource allocation.

(F) Further, a base station apparatus according to this Embodiment is a base station apparatus having a plurality of antennas to perform radio communications with a mobile station apparatus using all or a part of the plurality of antennas, has a scheduler section that periodically allocates communication resources to the mobile station apparatus in order for the mobile station apparatus to transmit transmission signal number-of-sequence information, and a transmission signal number-of-sequence information control section that determines the number of transmission signal sequences at least based on the transmission signal number-of-sequence information transmitted from the mobile station apparatus, and is characterized in that when the mobile station apparatus does not transmit the transmission signal number-of-sequence information with the communication resources, the transmission signal number-of-sequence information control section abandons feedback information transmitted from the mobile station apparatus until communication resources periodically allocated to transmit the transmission signal number-of-sequence information subsequent to the communication resources.

Thus, when the mobile station apparatus does not transmit the transmission signal number-of-sequence information with the communication resources, feedback information transmitted from the mobile station apparatus is abandoned for a period until communication resources periodically allocated to transmit the transmission signal number-of-sequence information subsequent to the communication resources. Therefore, when the mobile station apparatus cannot perform feedback of the transmission signal number-of-sequence information because a subframe that is the transmission timing of transmission signal number-of-sequence information is in a period of Non-active Time of DRX, even in the case that the mobile station apparatus performs feedback of the reception quality information and transmission signal preprocessing information for a period during which the Non-active Time of DRX ends and next feedback is performed on the transmission signal number-of-sequence information, the base station apparatus disables the information and is capable of performing downlink communication resource allocation in predetermined form. By this means, downlink communications can be performed as normally as possible.

(G) Further, a communication method according to this Embodiment is a communication method in which a mobile station apparatus periodically transmits feedback information including reception quality information indicative of reception quality, transmission signal preprocessing information used in performing preprocessing on a transmission signal, and transmission signal number-of-sequence information indicative of multiplexed transmission signal sequences to a base station apparatus, and the base station apparatus receives the feedback information periodically from the mobile station apparatus and allocates communication resources to the mobile station apparatus based on the received feedback information, and is characterized in that when the mobile station apparatus does not transmit the transmission signal number-of-sequence information with communication resources periodically allocated from the base station apparatus so as to transmit the transmission signal number-of-sequence information, the mobile station apparatus transmits the transmission signal number-of-sequence information to the base station apparatus with communication resources enabling transmission of the feedback information allocated from the base station apparatus subsequently to the communication resources, and that when the mobile station apparatus does not transmit the transmission signal number-of-sequence information with communication resources periodically allocated to transmit the transmission signal number-of-sequence information, the base station apparatus receives the transmission signal number-of-sequence information transmitted with communication resources enabling transmission of the feedback information allocated subsequently to the communication resources, and determines the number of transmission signal sequences.

Thus, when the mobile station apparatus does not transmit the transmission signal number-of-sequence information with communication resources periodically allocated from the base station apparatus so as to transmit the transmission signal number-of-sequence information, the mobile station apparatus transmits the transmission signal number-of-sequence information to the base station apparatus with communication resources enabling transmission of the feedback information allocated from the base station apparatus subsequently to the communication resources. Therefore, for example, even when the mobile station apparatus cannot transmit feedback of the transmission signal number-of-sequence information to the base station apparatus because a subframe that is the transmission timing of transmission signal number-of-sequence information is in a period of Non-active Time of DRX, the mobile station apparatus is capable of performing the feedback in a subframe in which uplink control channel resource allocation is performed subsequently to the end of the Non-active Time of DRX. By this means, the base station apparatus is capable of knowing the correct transmission signal number-of-sequence information after the end of the Non-active Time of DRX, and performing appropriate downlink communication resource allocation based on the subsequently transmitted reception quality information and transmission signal preprocessing information.

(H) Further, a communication system according to this Embodiment is characterized by being comprised of the mobile station apparatus as described in (A) and the base station apparatus as described in (D), the mobile station apparatus as described in (B) and the base station apparatus as described in (E), or the mobile station apparatus as described in (C) and the base station apparatus as described in (F).

According to this constitution, for example, after the end of Non-active Time of DRX in the mobile station apparatus, the base station apparatus is capable of knowing the correct transmission signal number-of-sequence information, and performing appropriate downlink communication resource allocation based on the subsequently transmitted reception quality information and transmission signal preprocessing information.

In the foregoing, each of the Embodiments of the invention is described specifically with reference to drawings, but specific constitutions are not limited to the above-mentioned Embodiments, and designs and others in the scope without departing from the subject matter of the invention are included in the scope of the claims.

The invention claimed is:

1. A mobile communication system, comprising:
a mobile station apparatus configured to periodically transmit transmission signal number-of-sequence information and transmission signal preprocessing information calculated based on the transmission signal number-of-sequence information to a base station apparatus,
wherein the mobile station apparatus is configured to calculate the transmission signal preprocessing information based on a predetermined number of transmission signal sequences in a case that the transmission signal number-of-sequence information is not transmitted to the base station apparatus, and
the base station apparatus is configured to process the transmission signal preprocessing information based on the predetermined number of transmission signal sequences in the case that the transmission signal number-of-sequence information is not transmitted from the mobile station.

2. The mobile communication system according to claim 1, wherein the predetermined number of transmission signal sequences is the minimum number of transmission signal sequences.

3. The mobile communication system according to claim 1, wherein the predetermined number of transmission signal sequences is the maximum number of transmission signal sequences.

4. A base station apparatus, comprising:
a receiving section configured to periodically receive transmission signal number-of-sequence information and transmission signal preprocessing information calculated in a mobile station apparatus based on the transmission signal number-of-sequence information from the mobile station apparatus; and
a processing section that is configured to process the transmission signal preprocessing information based on a predetermined number of transmission signal sequences in a case that the transmission signal number-of-sequence information is not transmitted from the mobile station.

5. The base station apparatus according to claim 4, wherein the predetermined number of transmission signal sequences is the minimum number of transmission signal sequences.

6. The base station apparatus according to claim 4, wherein the predetermined number of transmission signal sequences is the maximum number of transmission signal sequences.

7. A mobile station apparatus, comprising:
a transmitting section configured to periodically transmit transmission signal number-of-sequence information and transmission signal preprocessing information calculated based on the transmission signal number-of-sequence information to a base station apparatus; and
a processing section configured to calculate the transmission signal preprocessing information based on a predetermined number of transmission signal sequences in a case that the transmission signal number-of-sequence information is not transmitted to the base station apparatus, and transmits the calculated transmission signal preprocessing information to the base station apparatus.

8. The mobile station apparatus according to claim 7, wherein the predetermined number of transmission signal sequences is the minimum number of transmission signal sequences.

9. The mobile station apparatus according to claim 7, wherein the predetermined number of transmission signal sequences is the maximum number of transmission signal sequences.

10. A mobile communication system, comprising:
a mobile station apparatus configured to periodically transmit transmission signal number-of-sequence information and transmission signal preprocessing information calculated based on the transmission signal number-of-sequence information to a base station apparatus, and configured to calculate the transmission signal preprocessing information based on a usable minimum number of transmission signal sequences in a case that the transmission signal number-of-sequence information is not transmitted to the base station apparatus, and
the base station apparatus, configured to process the transmission signal preprocessing information based on the usable minimum number of transmission signal sequences in the case that the transmission signal number-of-sequence information is not transmitted from the mobile station.

11. A base station apparatus, comprising:
a receiving section configured to for periodically receive transmission signal number-of-sequence information and transmission signal preprocessing information calculated in a mobile station apparatus based on the transmission signal number-of-sequence information from the mobile station apparatus; and
a processing section configured to process the transmission signal preprocessing information based on a usable minimum number of transmission signal sequences in a case that the transmission signal number-of-sequence information is not transmitted from the mobile station.

12. A mobile station apparatus, comprising:
a transmitting section configured to periodically transmit transmission signal number-of-sequence information and transmission signal preprocessing information calculated based on the transmission signal number-of-sequence information to a base station apparatus; and
a processing section configured to calculate the transmission signal preprocessing information based on a usable minimum number of transmission signal sequences in a case that the transmission signal number-of-sequence information is not transmitted to the base station apparatus, and transmits the calculated transmission signal preprocessing information to the base station apparatus.

13. A communication method in a base station apparatus, the communication method comprising:
periodically receiving transmission signal number-of-sequence information and transmission signal preprocessing information calculated in a mobile station apparatus based on the transmission signal number-of-sequence information from the mobile station apparatus,
wherein in a case that the transmission signal number-of-sequence information is not transmitted from the mobile station, the transmission signal preprocessing information is processed based on a predetermined number of transmission signal sequences.

14. A communication method in a mobile station apparatus, the communication method comprising:
periodically transmitting transmission signal number-of-sequence information and transmission signal preprocessing information calculated based on the transmission signal number-of-sequence information to a base station apparatus,
wherein in a case that the transmission signal number-of-sequence information is not transmitted to the base station apparatus, the transmission signal preprocessing information is calculated based on a predetermined number of transmission signal sequences, and is transmitted to the base station apparatus.

15. A communication method in a base station apparatus, the communication method comprising:
periodically receiving transmission signal number-of-sequence information and transmission signal preprocessing information calculated in a mobile station apparatus based on the transmission signal number-of-sequence information from the mobile station apparatus,
wherein in a case that the transmission signal number-of-sequence information is not transmitted, the transmission signal preprocessing information is processed based on a usable minimum number of transmission signal sequences.

16. A communication method in a mobile station apparatus, the communication method comprising:
periodically transmitting transmission signal number-of-sequence information and transmission signal preprocessing information calculated based on the transmission signal number-of-sequence information to a base station apparatus;
wherein in a case that the transmission signal number-of-sequence information is not transmitted to the base station apparatus, the transmission signal preprocessing information is calculated based on a usable minimum number of transmission signal sequences, and is transmitted to the base station apparatus.

* * * * *